United States Patent
Khoshnevisan et al.

(10) Patent No.: US 11,963,190 B2
(45) Date of Patent: Apr. 16, 2024

(54) FLEXIBLE HANDLING OF SEARCH SPACE SETS FOR CONTROL RESOURCE SETS (CORESETS) CONFIGURED WITH MULTIPLE TRANSMISSION CONFIGURATION INDICATOR (TCI) STATES

(71) Applicant: QUALCOMM Incorporated, San Diego, CA (US)

(72) Inventors: Mostafa Khoshnevisan, San Diego, CA (US); Xiaoxia Zhang, San Diego, CA (US); Jing Sun, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 241 days.

(21) Appl. No.: 17/482,235

(22) Filed: Sep. 22, 2021

(65) Prior Publication Data

US 2022/0095357 A1 Mar. 24, 2022

Related U.S. Application Data

(60) Provisional application No. 63/082,852, filed on Sep. 24, 2020.

(51) Int. Cl.
*H04W 72/23* (2023.01)
*H04W 72/1273* (2023.01)

(52) U.S. Cl.
CPC ....... *H04W 72/23* (2023.01); *H04W 72/1273* (2013.01)

(58) Field of Classification Search
CPC ......... H04W 72/1289; H04W 72/1273; H04W 72/23
See application file for complete search history.

(56) References Cited

U.S. PATENT DOCUMENTS

| | | | |
|---|---|---|---|
| 2019/0313429 A1* | 10/2019 | Cheng | H04W 72/23 |
| 2020/0045569 A1* | 2/2020 | Seo | H04L 5/0048 |
| 2021/0050936 A1* | 2/2021 | Seo | H04L 5/0053 |
| 2021/0314974 A1* | 10/2021 | Miao | H04W 72/046 |
| 2021/0385802 A1* | 12/2021 | Bae | H04W 72/51 |

(Continued)

*Primary Examiner* — Chi Ho A Lee
(74) *Attorney, Agent, or Firm* — Holland & Hart LLP/Qualcomm Incorporated

(57) ABSTRACT

Methods, systems, and devices for wireless communications are described. In some systems, a base station may configure a user equipment (UE) with a control resource set (CORESET) with multiple transmission configuration indicator (TCI) states. The UE may determine TCI state configurations for one or more search space sets associated with the CORESET, where different search space sets associated with the CORESET may have different TCI state configurations. For example, each search space set may be associated with a first TCI state of the CORESET, a second TCI state of the CORESET, or both. The UE may monitor for downlink control information (DCI) messages in physical downlink control channel (PDCCH) candidates of the search space sets according to respective TCI state configurations for the search space sets. Such a configuration may flexibly support a base station transmitting DCI using different TCI state configurations in PDCCH candidates of a single CORESET.

27 Claims, 18 Drawing Sheets

(56) References Cited

U.S. PATENT DOCUMENTS

| | | | |
|---|---|---|---|
| 2022/0408475 A1* | 12/2022 | Cirik | H04W 72/23 |
| 2023/0096196 A1* | 3/2023 | Kim | H04L 5/0053 |
| | | | 370/329 |
| 2023/0180033 A1* | 6/2023 | Cirik | H04L 5/0094 |
| | | | 370/252 |

* cited by examiner

FLEXIBLE HANDLING OF SEARCH SPACE SETS FOR CONTROL RESOURCE SETS (CORESETS) CONFIGURED WITH MULTIPLE TRANSMISSION CONFIGURATION INDICATOR (TCI) STATES

CROSS REFERENCE

The present Application for Patent claims the benefit of U.S. Provisional Patent Application No. 63/082,852 by KHOSHNEVISAN et al., entitled "FLEXIBLE HANDLING OF SEARCH SPACE SETS FOR CONTROL RESOURCE SETS (CORESETS) CONFIGURED WITH MULTIPLE TRANSMISSION CONFIGURATION INDICATOR (TCI) STATES," filed Sep. 24, 2020, assigned to the assignee hereof, and expressly incorporated by reference herein.

FIELD OF TECHNOLOGY

The following relates to wireless communications, including flexible handling of search space sets for control resource sets (CORESETs) configured with multiple transmission configuration indicator (TCI) states.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may monitor for downlink control information (DCI) messages transmitted by a base station. The UE may be configured with a set of search space sets associated with a control resource set (CORESET), where the search space sets include physical downlink control channel (PDCCH) candidates. The UE may perform a blind decoding procedure on the configured PDCCH candidates to determine if any of the PDCCH candidates contain DCI messages transmitted by the base station. In some examples, configuring a large number of CORESETs to support different DCI transmission parameters may result in significant processing and configuration overhead at the UE.

SUMMARY

The described techniques relate to improved methods, systems, devices, and apparatuses that support flexible handling of search space sets for control resource sets (CORESETs) configured with multiple transmission configuration indicator (TCI) states. Generally, the described techniques provide for improved network flexibility in transmitting downlink control information (DCI) to a user equipment (UE) in a CORESET. For example, a base station may configure a UE with a CORESET with multiple TCI states. The UE may determine TCI state configurations for one or more search space sets associated with the CORESET, where different search space sets associated with the CORESET may have different TCI state configurations. For example, each search space set may be associated with the first TCI state of the CORESET, the second TCI state of the CORESET, or both. In some examples, the base station may transmit, to the UE, a radio resource control (RRC) message, a medium access control (MAC) control element (CE), or both indicating a TCI state configuration for a search space set. In some other examples, the UE may determine a TCI state configuration for a search space set associated with a CORESET with multiple TCI states based on a default configuration. The UE may monitor for DCI messages in physical downlink control channel (PDCCH) candidates of the search space sets according to the respective TCI state configurations for the search space sets. Such techniques may flexibly support a base station transmitting DCI messages to a UE using different TCI state configurations (e.g., a first TCI state, a second TCI state, or both) in PDCCH candidates of a single CORESET.

A method for wireless communications at a UE is described. The method may include receiving an indication of a CORESET configured with both a first TCI state and a second TCI state, monitoring for a first DCI message in a first PDCCH candidate of a first search space set of the CORESET according to a first TCI state configuration which indicates that the first search space set is associated with the first TCI state, the second TCI state, or both, and monitoring for a second DCI message in a second PDCCH candidate of a second search space set of the CORESET according to a second TCI state configuration which indicates that the second search space set is associated with the first TCI state, the second TCI state, or both, where the second TCI state configuration is different from the first TCI state configuration.

An apparatus for wireless communications is described. The apparatus may include a processor of a UE and memory coupled with the processor. The memory and the processor may be configured to receive an indication of a CORESET configured with both a first TCI state and a second TCI state, monitor for a first DCI message in a first PDCCH candidate of a first search space set of the CORESET according to a first TCI state configuration which indicates that the first search space set is associated with the first TCI state, the second TCI state, or both, and monitor for a second DCI message in a second PDCCH candidate of a second search space set of the CORESET according to a second TCI state configuration which indicates that the second search space set is associated with the first TCI state, the second TCI state, or both, where the second TCI state configuration is different from the first TCI state configuration.

Another apparatus for wireless communications at a UE is described. The apparatus may include means for receiving an indication of a CORESET configured with both a first TCI state and a second TCI state, monitoring for a first DCI message in a first PDCCH candidate of a first search space set of the CORESET according to a first TCI state configuration which indicates that the first search space set is associated with the first TCI state, the second TCI state, or both, and monitoring for a second DCI message in a second PDCCH candidate of a second search space set of the CORESET according to a second TCI state configuration which indicates that the second search space set is associated with the first TCI state, the second TCI state, or both, where the second TCI state configuration is different from the first TCI state configuration.

A non-transitory computer-readable medium storing code for wireless communications at a UE is described. The code may include instructions executable by a processor to receive an indication of a CORESET configured with both a first TCI state and a second TCI state, monitor for a first DCI message in a first PDCCH candidate of a first search space set of the CORESET according to a first TCI state configuration which indicates that the first search space set is associated with the first TCI state, the second TCI state, or both, and monitor for a second DCI message in a second PDCCH candidate of a second search space set of the CORESET according to a second TCI state configuration which indicates that the second search space set is associated with the first TCI state, the second TCI state, or both, where the second TCI state configuration is different from the first TCI state configuration.

Some examples of the method, apparatuses, and non-transitory computer-readable medium described herein may further include operations, features, means, or instructions for receiving an RRC message configuring the first search space set with the CORESET and the first TCI state configuration, the second search space set with the CORESET and the second TCI state configuration, or a combination thereof.

Some examples of the method, apparatuses, and non-transitory computer-readable medium described herein may further include operations, features, means, or instructions for receiving a MAC-CE indicating a first identifier (ID) for the first search space set, an association between the first search space set and the CORESET, and the first TCI state configuration for the first search space set, a second ID for the second search space set, an association between the second search space set and the CORESET, and the second TCI state configuration for the second search space set, or a combination thereof.

Some examples of the method, apparatuses, and non-transitory computer-readable medium described herein may further include operations, features, means, or instructions for determining the first TCI state configuration for the first search space set based on the first search space set being associated with the CORESET configured with both the first TCI state and the second TCI state.

Some examples of the method, apparatuses, and non-transitory computer-readable medium described herein may further include operations, features, means, or instructions for determining an absence of a TCI state configuration configured by a base station for the first search space set, where the first TCI state configuration may be determined based on the determined absence.

In some examples of the method, apparatuses, and non-transitory computer-readable medium described herein, determining the first TCI state configuration may include operations, features, means, or instructions for determining that the first search space set is associated with the first TCI state based on the determined absence and the first search space set being associated with the CORESET configured with both the first TCI state and the second TCI state.

In some examples of the method, apparatuses, and non-transitory computer-readable medium described herein, determining the first TCI state configuration may include operations, features, means, or instructions for determining that the first search space set is associated with both the first TCI state and the second TCI state based on the determined absence and the first search space set being associated with the CORESET configured with both the first TCI state and the second TCI state.

In some examples of the method, apparatuses, and non-transitory computer-readable medium described herein, the CORESET includes a set of resource blocks (RBs), the set of RBs including a first set of RBs configured with the first TCI state and a second set of RBs configured with the second TCI state, the first TCI state configuration includes the first TCI state and not the second TCI state, and the first search space set may be associated with the set of RBs of the CORESET. In some examples of the method, apparatuses, and non-transitory computer-readable medium described herein, monitoring for the first DCI message in the first PDCCH candidate of the first search space set may include operations, features, means, or instructions for monitoring for the first DCI message in the first PDCCH candidate of the first search space set according to the first TCI state for the set of RBs based on the first search space set being associated with the set of RBs of the CORESET.

In some examples of the method, apparatuses, and non-transitory computer-readable medium described herein, the CORESET includes a set of RBs, the set of RBs including a first set of RBs configured with the first TCI state and a second set of RBs configured with the second TCI state, the first TCI state configuration includes the first TCI state and not the second TCI state, and the first search space set may be associated with the first set of RBs configured with the first TCI state based on the first TCI state configuration including the first TCI state and not the second TCI state. In some examples of the method, apparatuses, and non-transitory computer-readable medium described herein, monitoring for the first DCI message in the first PDCCH candidate of the first search space set may include operations, features, means, or instructions for monitoring for the first DCI message in the first PDCCH candidate of the first search space set according to the first TCI state for the first set of RBs based on the first search space set being associated with the first set of resource blocks of the CORESET.

In some examples of the method, apparatuses, and non-transitory computer-readable medium described herein, the CORESET includes a set of symbols, the set of symbols including a first set of symbols configured with the first TCI state and a second set of symbols configured with the second TCI state, the first TCI state configuration includes the first TCI state and not the second TCI state, and the first search space set may be associated with the set of symbols of the CORESET. In some examples of the method, apparatuses, and non-transitory computer-readable medium described herein, monitoring for the first DCI message in the first PDCCH candidate of the first search space set may include operations, features, means, or instructions for monitoring for the first DCI message in the first PDCCH candidate of the first search space set according to the first TCI state for the set of symbols based on the first search space set being associated with the set of symbols of the CORESET.

In some examples of the method, apparatuses, and non-transitory computer-readable medium described herein, the CORESET includes a set of symbols, the set of symbols including a first set of symbols configured with the first TCI state and a second set of symbols configured with the second TCI state, the first TCI state configuration includes the first TCI state and not the second TCI state, and the first search space set may be associated with the first set of symbols configured with the first TCI state based on the first TCI state configuration including the first TCI state and not the second TCI state. In some examples of the method, apparatuses, and non-transitory computer-readable medium described herein, monitoring for the first DCI message in the first PDCCH candidate of the first search space set may include operations, features, means, or instructions for monitoring for the first DCI message in the first PDCCH candidate of the first search space set according to the first TCI state for the first set of symbols based on the first search space set being associated with the first set of symbols of the CORESET.

In some examples of the method, apparatuses, and non-transitory computer-readable medium described herein, the first PDCCH candidate and the second PDCCH candidate may be non-overlapping in a time domain.

In some examples of the method, apparatuses, and non-transitory computer-readable medium described herein, the first PDCCH candidate and the second PDCCH candidate may be non-overlapping in a time domain, partially overlapping in the time domain, or fully overlapping in the time domain.

In some examples of the method, apparatuses, and non-transitory computer-readable medium described herein, the first PDCCH candidate and the second PDCCH candidate use a same set of control channel elements (CCEs) of the CORESET, and the first PDCCH candidate corresponds to a first DCI format and the second PDCCH candidate corresponds to a second DCI format, the first DCI format having a same size as the second DCI format.

Some examples of the method, apparatuses, and non-transitory computer-readable medium described herein may further include operations, features, means, or instructions for counting the first PDCCH candidate and the second PDCCH candidate separately towards a blind decoding (BD) limit based on the second TCI state configuration being different from the first TCI state configuration.

Some examples of the method, apparatuses, and non-transitory computer-readable medium described herein may further include operations, features, means, or instructions for counting the first PDCCH candidate and the second PDCCH candidate jointly towards a BD limit based on the first PDCCH candidate and the second PDCCH candidate using the same set of CCEs and the first DCI format having the same size as the second DCI format.

In some examples of the method, apparatuses, and non-transitory computer-readable medium described herein, receiving the indication of the CORESET may include operations, features, means, or instructions for receiving an RRC message configuring the CORESET with both the first TCI state and the second TCI state.

In some examples of the method, apparatuses, and non-transitory computer-readable medium described herein, receiving the indication of the CORESET may include operations, features, means, or instructions for receiving a MAC-CE activating the CORESET with both the first TCI state and the second TCI state.

A method for wireless communications at a base station is described. The method may include configuring a CORESET with both a first TCI state and a second TCI state, transmitting a first DCI message in a first PDCCH candidate of a first search space set of the CORESET according to a first TCI state configuration which indicates that the first search space set is associated with the first TCI state, the second TCI state, or both, and transmitting a second DCI message in a second PDCCH candidate of a second search space set of the CORESET according to a second TCI state configuration which indicates that the second search space set is associated with the first TCI state, the second TCI state, or both, where the second TCI state configuration is different from the first TCI state configuration.

An apparatus for wireless communications is described. The apparatus may include a processor of a base station and memory coupled with the processor. The memory and the processor may be configured to configure a CORESET with both a first TCI state and a second TCI state, transmit a first DCI message in a first PDCCH candidate of a first search space set of the CORESET according to a first TCI state configuration which indicates that the first search space set is associated with the first TCI state, the second TCI state, or both, and transmit a second DCI message in a second PDCCH candidate of a second search space set of the CORESET according to a second TCI state configuration which indicates that the second search space set is associated with the first TCI state, the second TCI state, or both, where the second TCI state configuration is different from the first TCI state configuration.

Another apparatus for wireless communications at a base station is described. The apparatus may include means for configuring a CORESET with both a first TCI state and a second TCI state, transmitting a first DCI message in a first PDCCH candidate of a first search space set of the CORESET according to a first TCI state configuration which indicates that the first search space set is associated with the first TCI state, the second TCI state, or both, and transmitting a second DCI message in a second PDCCH candidate of a second search space set of the CORESET according to a second TCI state configuration which indicates that the second search space set is associated with the first TCI state, the second TCI state, or both, where the second TCI state configuration is different from the first TCI state configuration.

A non-transitory computer-readable medium storing code for wireless communications at a base station is described. The code may include instructions executable by a processor to configure a CORESET with both a first TCI state and a second TCI state, transmit a first DCI message in a first PDCCH candidate of a first search space set of the CORESET according to a first TCI state configuration which indicates that the first search space set is associated with the first TCI state, the second TCI state, or both, and transmit a second DCI message in a second PDCCH candidate of a second search space set of the CORESET according to a second TCI state configuration which indicates that the second search space set is associated with the first TCI state, the second TCI state, or both, where the second TCI state configuration is different from the first TCI state configuration.

Some examples of the method, apparatuses, and non-transitory computer-readable medium described herein may further include operations, features, means, or instructions for transmitting an RRC message configuring the first search space set with the CORESET and the first TCI state configuration, the second search space set with the CORESET and the second TCI state configuration, or a combination thereof.

Some examples of the method, apparatuses, and non-transitory computer-readable medium described herein may further include operations, features, means, or instructions for transmitting a MAC-CE indicating a first ID for the first search space set, an association between the first search space set and the CORESET, and the first TCI state configuration for the first search space set, a second ID for the second search space set, an association between the second search space set and the CORESET, and the second TCI state configuration for the second search space set, or a combination thereof.

Some examples of the method, apparatuses, and non-transitory computer-readable medium described herein may further include operations, features, means, or instructions for refraining from transmitting an indication of a TCI state configuration for the first search space set and determining the first TCI state configuration for the first search space set based on the first search space set being associated with the CORESET configured with both the first TCI state and the second TCI state and based on refraining from transmitting the indication of the TCI state configuration for the first search space set.

In some examples of the method, apparatuses, and non-transitory computer-readable medium described herein, determining the first TCI state configuration may include operations, features, means, or instructions for determining that the first search space set is associated with the first TCI state based on refraining from transmitting the indication of the TCI state configuration for the first search space set and based on the first search space set being associated with the CORESET configured with both the first TCI state and the second TCI state.

In some examples of the method, apparatuses, and non-transitory computer-readable medium described herein, determining the first TCI state configuration may include operations, features, means, or instructions for determining that the first search space set is associated with both the first TCI state and the second TCI state based on refraining from transmitting the indication of the TCI state configuration for the first search space set and based on the first search space set being associated with the CORESET configured with both the first TCI state and the second TCI state.

Some examples of the method, apparatuses, and non-transitory computer-readable medium described herein may further include operations, features, means, or instructions for configuring the first PDCCH candidate and the second PDCCH candidate such that the first PDCCH candidate and the second PDCCH candidate may be non-overlapping in a time domain based on the second TCI state configuration being different from the first TCI state configuration.

Some examples of the method, apparatuses, and non-transitory computer-readable medium described herein may further include operations, features, means, or instructions for configuring the first PDCCH candidate and the second PDCCH candidate such that the first PDCCH candidate and the second PDCCH candidate either may be non-overlapping in a time domain or may be fully overlapping in the time domain based on the second TCI state configuration being different from the first TCI state configuration.

Some examples of the method, apparatuses, and non-transitory computer-readable medium described herein may further include operations, features, means, or instructions for configuring the first PDCCH candidate and the second PDCCH candidate such that the first PDCCH candidate and the second PDCCH candidate may be non-overlapping in a time domain, may be partially overlapping in the time domain, or may be fully overlapping in the time domain.

Some examples of the method, apparatuses, and non-transitory computer-readable medium described herein may further include operations, features, means, or instructions for transmitting an RRC message configuring the CORESET with the first TCI state and the second TCI state.

Some examples of the method, apparatuses, and non-transitory computer-readable medium described herein may further include operations, features, means, or instructions for transmitting a MAC-CE activating the CORESET with both the first TCI state and the second TCI state.

DETAILED DESCRIPTION

Figure 1:
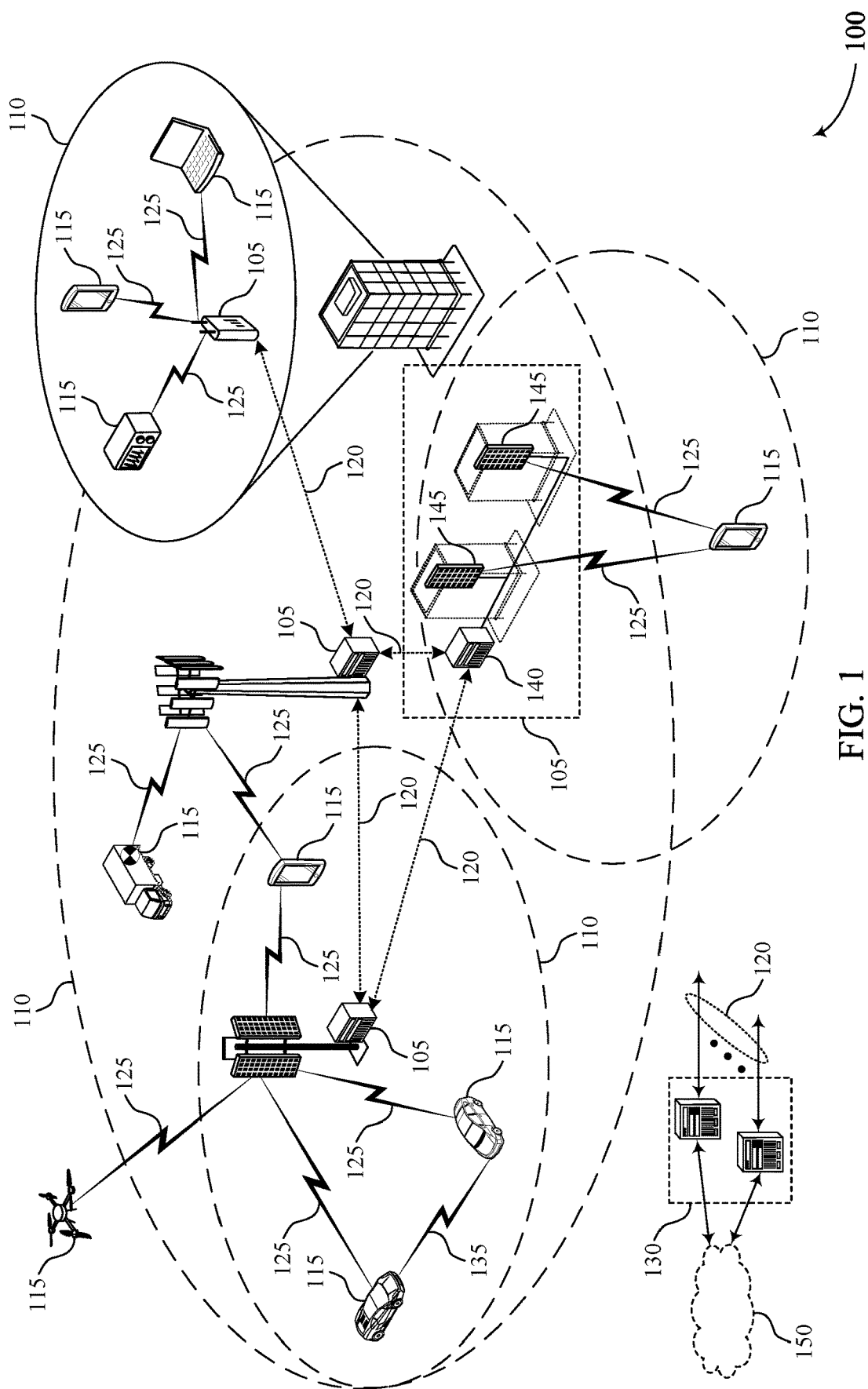
FIGS. 1 and 2 illustrate examples of wireless communications systems that support flexible handling of search space sets for control resource sets (CORESETs) configured with multiple transmission configuration indicator (TCI) states in accordance with aspects of the present disclosure.

In some wireless communications systems, a user equipment (UE) may monitor for downlink control information (DCI) messages transmitted by a base station. The UE may be configured with one or more search space sets associated with a control resource set (CORESET), where the search space sets include physical downlink control channel (PDCCH) candidates. The UE may perform a blind decoding procedure on the configured PDCCH candidates to determine if any of the PDCCH candidates contain DCI messages transmitted by the base station. Additionally, each CORESET may be configured with one or more transmission configuration indicator (TCI) states. If a CORESET is configured with one TCI state, the search space sets and corresponding PDCCH candidates associated with the CORESET may correspondingly be associated with the one TCI state. However, in some examples, a CORESET may be configured with multiple TCI states (e.g., a first TCI state and a second TCI state). If the search space sets and corresponding PDCCH candidates associated with the CORESET are correspondingly associated with the same multiple TCI states, a base station may fail to support flexible TCI state selection for the CORESET.

As described herein, a wireless communications system may support flexible handling of search space sets for CORESETs configured with multiple TCI states. For example, a base station may configure a UE with a CORESET with multiple TCI states (e.g., a first TCI state and a second TCI state). Based on the CORESET configuration, the UE may determine TCI state configurations for one or more search space sets associated with the CORESET, where different search space sets associated with the CORESET may have different TCI state configurations. For example, each search space set may be associated with the first TCI state of the CORESET, the second TCI state of the CORESET, or both. The UE may monitor for DCI messages in PDCCH candidates of the search space sets according to the respective TCI state configurations for the search space sets. For example, the UE may monitor for a DCI message in a first PDCCH candidate of a first search space set associated with the CORESET according to a first TCI state configuration (e.g., including both the first and second TCI states) for the first search space set, and the UE may monitor for a DCI message in a second PDCCH candidate of a second search space set associated with the CORESET according to a second TCI state configuration (e.g., including the first TCI state, but not the second TCI state) for the second search space set. Based on such a configuration, the base station may flexibly select whether to use the first TCI state, the second TCI state, or both to transmit a DCI message to the UE in the CORESET.

In some examples, the base station may transmit, to the UE, a radio resource control (RRC) message configuring one or more search space sets with one or more TCI states (e.g., based on the TCI states configured for the associated CORESET). In some other examples, the base station may transmit, to the UE, a medium access control (MAC) control element (CE) configuring one or more search space sets with one or more TCI states (e.g., based on the TCI states configured for the associated CORESET). In some examples, the UE may determine a TCI state configuration for a search space set associated with a CORESET with multiple TCI states based on a default configuration. For example, if the UE fails to receive a message (e.g., an RRC message or MAC-CE) configuring a search space set with a TCI state configuration, the UE may determine a default TCI state configuration for the search space set based on one or more TCI states configured for the associated CORESET.

In some examples, a UE may determine a PDCCH monitoring occasion in a search space set based on a configuration of the TCI states for a CORESET. For example, if the CORESET has a first set of resource blocks (RBs) corresponding to a first TCI state and a second set of RBs corresponding to a second TCI state, a search space set associated with the first TCI state—but not the second TCI state—may be associated with all of the RBs of the CORESET or just the RBs of the CORESET corresponding to the first TCI state. Similarly, if the CORESET has a first set of symbols (e.g., orthogonal frequency division multiplexing (OFDM) symbols) corresponding to a first TCI state and a second set of symbols corresponding to a second TCI state, a search space set associated with the first TCI state—but not the second TCI state—may be associated with all of the symbols of the CORESET or just the symbols of the CORESET corresponding to the first TCI state.

Additionally or alternatively, a UE may support a number of rules based on whether different search space sets of a CORESET correspond to different TCI state configurations. In some cases, if two search space sets associated with the same CORESET correspond to different TCI state configurations, the UE may not support the search space sets overlapping in time. In some other cases, the UE may support the search space sets not overlapping in time or fully overlapping in time, but not partially overlapping in time. In yet some other cases, the UE may support the search space sets not overlapping in time, partially overlapping in time, or fully overlapping in time. Additionally or alternatively, in some cases, if PDCCH candidates of the search space sets with different TCI state configurations use the same set of control channel elements (CCEs), correspond to DCI formats of the same size, and are associated with the same CORESET, the UE may count monitoring the PDCCH candidates separately when determining whether the number of monitoring processes exceeds a blind decoding (BD) limit at the UE (e.g., based on the different PDCCH candidates corresponding to different TCI state configurations). Alternatively, the UE may count the PDCCH candidates jointly towards the BD limit.

Aspects of the disclosure are initially described in the context of wireless communications systems. Additional aspects of the disclosure are described with reference to TCI state configurations, search space set configurations, and a process flow. Aspects of the disclosure are further illustrated by and described with reference to apparatus diagrams, system diagrams, and flowcharts that relate to flexible handling of search space sets for CORESETs configured with multiple TCI states.

FIG. 1 illustrates an example of a wireless communications system 100 that supports flexible handling of search space sets for CORESETs configured with multiple TCI states in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as OFDM or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a CORESET) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., CCEs) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

As described herein, a UE 115 may monitor for control information in one or more CORESETs. For example, the UE 115 may be configured with up to a threshold number of CORESETs (e.g., 3 CORESETs, 5 CORESETs, or another quantity of CORESETs) in a BWP of a component carrier (e.g., corresponding to a serving cell). For example, a base station 105 may configure the one or more CORESETs for the UE 115 using an RRC message. The CORESET configuration may involve configuring a set of RBs for the CORESET in the frequency domain, configuring a set of symbols in the time domain, or both. Additionally, the base station 105 may configure the CORESET with one or multiple active TCI states. For example, to enable a PDCCH transmission with two TCI states, the base station 105 may configure a CORESET with two active TCI states.

The base station 105 may further configure a number of search space sets for each CORESET. For example, each search space set may be associated with one CORESET, and the UE 115 may be configured with up to a threshold number (e.g., 10) of search space sets in a BWP of a component carrier. The base station 105 may configure the one or more search space sets for the UE 115 using an RRC message (e.g., the same RRC message used to configure the CORESET or another RRC message). The search space set configuration may involve configuring an association between the search space set and a CORESET, time domain monitoring information (e.g., a monitoring slot periodicity, a monitoring slot offset, the symbols to monitor within a slot), DCI format monitoring information, a number of PDCCH candidates to monitor for a given aggregation level, or any combination thereof. As such, the PDCCH candidates may be configured as part of a respective search space set. That is, via search space set configuration, a base station 105 may configure a UE 115 with multiple PDCCH candidates, where a PDCCH candidate of a specific aggregation level and with a specific candidate index may be defined in a specific search space set.

The UE 115 may monitor for control information in the configured PDCCH candidates (e.g., according to the search space set configuration and CORESET configuration for the corresponding search space set and associated CORESET). For example, the UE 115 may perform a blind decoding process on the PDCCH candidates for the configured search space sets and CORESETs. If the blind decoding process for a PDCCH candidates passes a checking process (e.g., a cyclic redundancy check (CRC)), the UE 115 may determine that the blind decoding process for the PDCCH candidate is successful and, correspondingly, the PDCCH candidate corresponds to a DCI message received and decoded at the UE 115. As described herein, a UE 115 may receive one DCI message in one configured PDCCH candidate.

In some examples, the UE 115 may be configured with a CORESET with multiple active TCI states. In some such examples, the UE 115 may be unable to determine the TCI state(s) for the corresponding PDCCH candidates. For example, if a CORESET is configured with an active first TCI state and an active second TCI state, the UE 115 may fail to determine whether a PDCCH candidate of the CORESET is associated with the first TCI state, the second TCI state, or both. Further, if the UE 115 defaults to associating the PDCCH candidate with all TCI states associated with the CORESET (e.g., both the first TCI state and the second TCI state), the TCI state flexibility configured by the network may be negatively affected. For example, in order to transmit a DCI message using the first TCI state, the second TCI state, or both, the base station 105 may configure three CORESETs, one associated with the first TCI state, one associated with the second TCI state, and one associated with both. Such a configuration may be inefficient, involving a significant configuration signaling overhead and using a significant number of a UE's threshold number of CORESETs per BWP of a component carrier.

To support flexible handling of TCI states in a CORESET configured with multiple TCI states, the wireless communications system 100 may support TCI state configuration at a search space set granularity (e.g., as opposed to at the CORESET granularity). For example, the base station 105 may configure a CORESET with multiple TCI states and may further configure a search space set associated with the CORESET with one or more multiple TCI states (e.g., of the TCI states configured for the CORESET). In this way, PDCCH candidates configured for a first search space set of the CORESET and PDCCH candidates configured for a second search space set of the CORESET may correspond to different TCI state configurations. For example, if a CORESET is configured with a first TCI state and a second TCI state, a first set of PDCCH candidates for a first search space set associated with the CORESET may be configured with the first TCI state, a second set of PDCCH candidates for a second search space set associated with the CORESET may be configured with the second TCI state, a third set of PDCCH candidates for a third search space set associated with the CORESET may be configured with both the first TCI state and the second TCI state, or any combination thereof. Specifically, a CORESET configured with both a first and a second TCI state may be used for PDCCH candidates with both TCI states, but may also be used for PDCCH candidates with the first TCI state (but not the second TCI state) and PDCCH candidates with the second TCI state (but not the first TCI state). Such a configuration may support flexible handling of TCI states for search space sets, providing a base station 105 flexibility in transmitting DCI messages within a CORESET configured with multiple TCI states while maintaining a relatively low configuration signaling overhead (e.g., based on a single CORESET supporting multiple TCI state combinations for DCI messages). For example, the network may flexibly transmit DCI in a PDCCH candidate with the first TCI state, the second TCI state, or both in a single CORESET configured with both the first and second TCI states.

Figure 2:
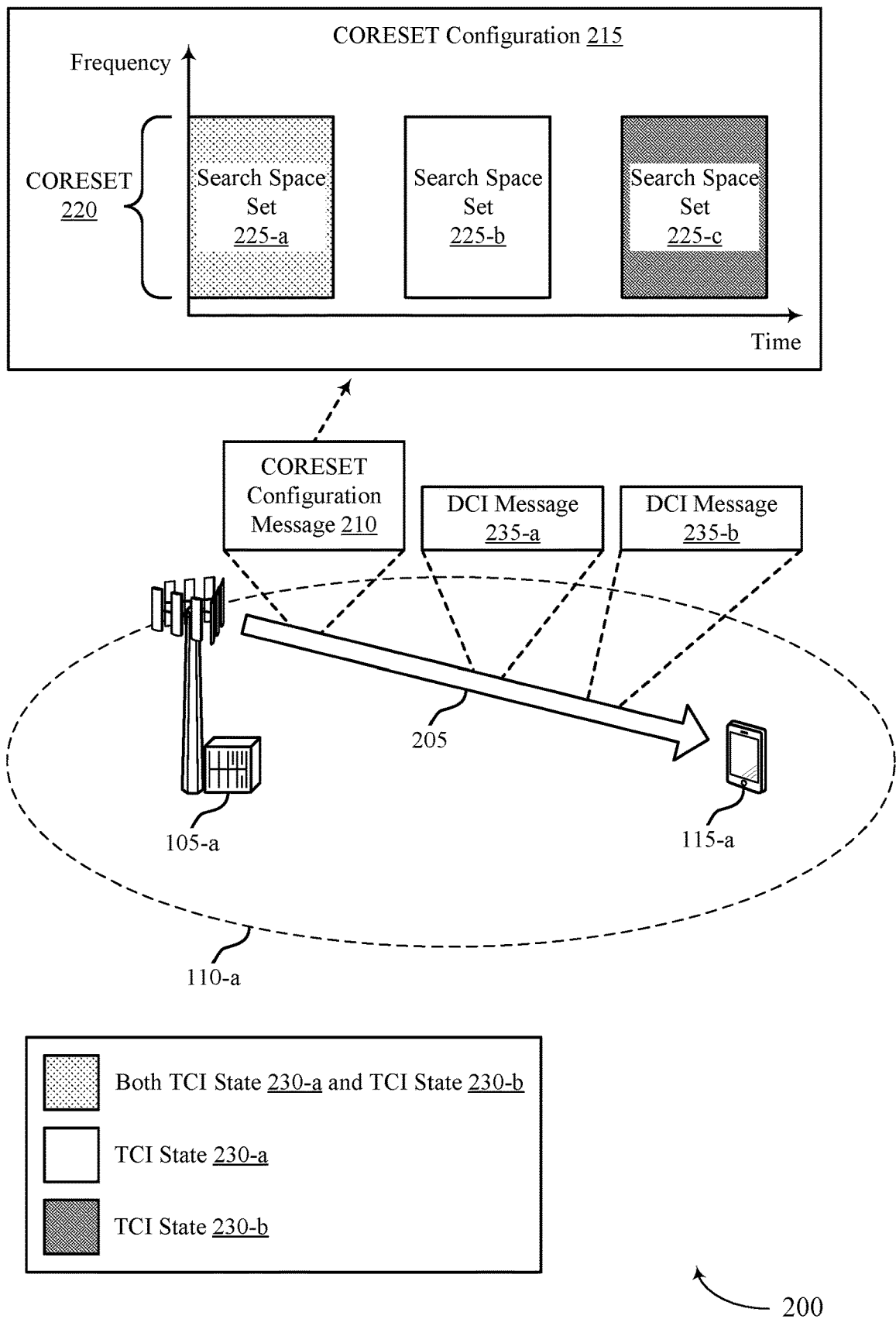

FIG. 2 illustrates an example of a wireless communications system 200 that supports flexible handling of search space sets for CORESETs configured with multiple TCI states in accordance with aspects of the present disclosure. In some examples, the wireless communications system 200 may include a UE 115-a and a base station 105-a, which may be examples of the corresponding devices described with reference to FIG. 1. The base station 105-a may provide service for a coverage area 110-a. The base station 105-a and UE 115-a may communicate over one or more wireless communications links. For example, the base station 105-a may transmit information to the UE 115-a over one or more downlink channels 205. In some examples, the base station 105-a may configure the UE 115-a with a CORESET 220, including one or more search space sets 225, to monitor for DCI messages 235. If the CORESET 220 is configured with multiple TCI states 230, the UE 115-a may flexibly handle the search space sets 225 of the CORESET 220 to support one or both of the TCI states 230.

The base station 105-a may configure the CORESET 220 for the UE 115-a using a CORESET configuration message 210. In some examples, the CORESET configuration message 210 may be an example of an RRC message, and the base station 105-a may transmit the RRC message (e.g., as a dedicated RRC message) to the UE 115-a configured the CORESET 220. In some other examples, the CORESET configuration message 210 may be an example of a MAC-CE, and the base station 105-a may transmit the MAC-CE to the UE 115-a to activate the CORESET 220 or activate multiple TCI states 230 for the CORESET 220. The base station 105-a may configure the CORESET 220, activate the CORESET 220, or both with multiple TCI states 230 (e.g., a first TCI state 230-a and a second TCI state 230-b). For example, the RRC message, MAC-CE, or both may include a field indicating one or more TCI states 230 for a configured CORESET 220. Based on the CORESET configuration message 210, the UE 115-a may determine the CORESET configuration 215.

The base station 105-a may further configure one or more search space sets 225 associated with the CORESET 220. For example, the base station 105-a may transmit an RRC message, a MAC-CE, or both to configure or active one or more search space sets 225. In some examples, the base station 105-a may configure or activate one or more CORESETs 220 and one or more search space sets 225 using a single configuration message (e.g., RRC message, MAC-CE, or another configuration message). The base station 105-a may configure a search space set 225 with one or more of the TCI states 230 configured for the associated CORESET 220. For example, a search space set 225 may be associated with any combination of the TCI states 230 of the CORESET 220. If the CORESET 220 is configured, activated, or both with two TCI states (e.g., a first TCI state 230-a and a second TCI state 230-b), the base station 105-a may configure a search space set 225 associated with the CORESET 220 with one or both of the TCI states 230. In a first example, a search space set 225-a may be configured with both the first TCI state 230-a and the second TCI state 230-b of the CORESET 220. Accordingly, all PDCCH candidates of the search space set 225-a may correspond to both the first TCI state 230-a and the second TCI state 230-b. The base station 105-a may transmit DCI messages 235 in the PDCCH candidates of the search space set 225-a using both the first TCI state 230-a and the second TCI state 230-b. In a second example, a search space set 225-b may be configured with the first TCI state 230-a (e.g., but not the second TCI state 230-b). Accordingly, all PDCCH candidates of the search space set 225-*b* may correspond to the first TCI state 230-*a*, and the base station 105-*a* may transmit DCI messages 235 in the PDCCH candidates of the search space set 225-*b* using the first TCI state 230-*a* (e.g., and not the second TCI state 230-*b*). In a third example, a search space set 225-*c* may be configured with the second TCI state 230-*b* (e.g., but not the first TCI state 230-*a*). Accordingly, all PDCCH candidates of the search space set 225-*c* may correspond to the second TCI state 230-*b*, and the base station 105-*a* may transmit DCI messages 235 in the PDCCH candidates of the search space set 225-*c* using the second TCI state 230-*b* (e.g., and not the first TCI state 230-*a*).

In some examples, the base station 105-*a* may configure or activate a search space set 225 using an RRC configuration. For example, the base station 105-*a* may transmit an RRC message indicating a search space set 225 (e.g., via a search space set index or ID), an associated CORESET 220 (e.g., using a CORESET index or ID), and one or more TCI states 230. In some cases, the RRC message may include a bit field indicating the first TCI state 230-*a*, the second TCI state 230-*b*, or both TCI states 230. In some examples, the UE 115-*a* may determine the configured TCI states 230 for the search space set 225 based on the TCI state indicator in the RRC message, the TCI states 230 configured for the base station 105-*a*, or a combination thereof. For example, the TCI state indicator may correspond to a first TCI state 230-*a* configured for the CORESET 220, a second TCI state 230-*b* configured for the CORESET 220, or both. In some cases, the TCI state indicator may indicate one or more TCI state indexes, one or more indexes corresponding to TCI states 230 for the CORESET 220, one or more parameters for a TCI state (e.g., parameters for configuring a quasi co-location (QCL) relationship, an antenna port, or any other TCI state parameters), or any combination thereof.

In some other examples, the base station 105-*a* may configure or activate a search space set 225 (e.g., activate the TCI states 230 for a search space set 225) using a MAC-CE. For example, the base station 105-*a* may transmit a MAC-CE indicating a search space set 225 (e.g., via a search space set index or ID), an associated CORESET 220 (e.g., using a CORESET index or ID), and one or more TCI states 230. In some cases, the MAC-CE may include a bit field indicating the first TCI state 230-*a*, the second TCI state 230-*b*, or both TCI states 230. For example, the bit field my indicate one or more TCI state indexes, one or more indexes corresponding to TCI states 230 for the CORESET 220, one or more parameters for a TCI state (e.g., parameters for configuring a QCL relationship, an antenna port, or any other TCI state parameters), or any combination thereof.

Additionally or alternatively, the UE 115-*a* may determine one or more TCI states 230 for a search space set 225 based on a rule. For example, the UE 115-*a* may store a defined rule in memory or may receive a configuration message (e.g., from the base station 105-*a*) configuring the rule. The rule may define a "default behavior" if the UE 115-*a* does not receive a configuration of one or more TCI states 230 for a search space set 225 associated with a CORESET 220 configured with multiple TCI states 230. That is, the UE 115-*a* may operate according to the rule unless the UE 115-*a* receives a message explicitly indicating (e.g., overriding) the TCI state configuration for a search space set 225. The rule may define a TCI state 230 for a search space set 225 if the search space set 225 is associated with a CORESET 220 with multiple TCI states 230. In a first example (e.g., in the absence of a configuration or indication of one or more TCI states 230 for a search space set 225), the UE 115-*a* may determine that the search space set 225 is associated with the first TCI state 230 of the CORESET 220, but not any other TCI states 230. In a second example (e.g., in the absence of a configuration or indication of one or more TCI states 230 for a search space set 225), the UE 115-*a* may determine that the search space set 225 is associated with all TCI states 230 of the CORESET 220. For example, as described herein, the UE 115-*a* may determine that the search space set 225 is associated with both the first TCI state 230-*a* and the second TCI state 230-*b* of the CORESET 220.

Based on the configuration of the CORESET 220 and one or more associated search space sets 225, the UE 115-*a* may receive multiple DCI messages 235 in a single CORESET 220 according to different TCI states 230. For example, the UE 115-*a* may receive a first DCI message 235-*a* in a PDCCH candidate of a search space set 225-*a* of the CORESET 220 according to both TCI states 230 and may receive a second DCI message 235-*b* in a PDCCH candidate of search space set 225-*b* of the CORESET 220 according to the first TCI state 230-*b*. Such a configuration may support more flexibility in the base station 105-*a* selecting one or more TCI states 230 for transmitting DCI (e.g., to improve reliability of DCI transmission, improve transmission diversity, or both).

In some examples, if multiple PDCCH candidates use a same set of CCEs in a same CORESET 220 (e.g., either in a same search space set 225 or search space sets 225 associated with the same CORESET 220), and corresponding DCI formats for the PDCCH candidates have a same size, the UE 115-*a* may count the multiple PDCCH candidates once towards a blind decoding (BD) limit. For example, because the PDCCH candidates are received in the same resources using DCI formats of the same size, the UE 115-*a* may use a same BD process to attempt to receive a DCI message 235 in any of the PDCCH candidates. Accordingly, the UE 115-*a* may count monitoring each of these PDCCH candidates as if the UE 115-*a* is monitoring a single PDCCH candidate with regard to a BD limit defined or configured at the UE 115-*a*. Specifically, a PDCCH candidate with index $m_{s_j,n_{CI}}$ for a search space set $s_j$ using a set of CCEs in a CORESET p on an active downlink BWP for a serving cell $n_{CI}$ may not be counted for monitoring if there is a PDCCH candidate with index $m_{s_j,n_{CI}}$ for a search space set $s_i < s_j$, or if there is a PDCCH candidate with index $m_{s_j,n_{CI}}$ and $m_{s_j,n_{CI}} < m_{s_j,n_{CI}}$, in the CORESET p on the active downlink BWP for the serving cell $n_{CI}$ using a same set of CCEs, the PDCCH candidates have identical scrambling, and the corresponding DCI formats for the PDCCH candidates have a same size; otherwise, the PDCCH candidate with index $m_{s_j,n_{CI}}$ may be counted for monitoring (e.g., towards a BD limit).

In some cases, however, the UE 115-*a* may separately count the overlapping PDCCH candidates if they correspond to different TCI state configurations. For example, if two PDCCH candidates correspond to the same CORESET 220 with two active TCI states 230, but the two PDCCH candidates do not correspond to the same TCI state configuration of the CORESET 220, the UE 115-*a* may count the PDCCH candidates as separate PDCCH candidates for monitoring (e.g., towards the BD limit). That is, even if the PDCCH candidates both use the same set of CCEs and corresponding DCI formats for the PDCCH candidates have a same size, the UE 115-*a* may count the PDCCH candidates separately for monitoring based on the UE 115-*a* monitoring the PDCCH candidates according to different TCI state configurations. Specifically, a PDCCH candidate with index $m_{s_j,n_{CI}}$ for a search space set $s_j$ using a set of CCEs in a CORESET p on an active downlink BWP for a serving cell $n_{CI}$ may not be counted for monitoring if there is a PDCCH candidate with index $m_{s_i,n_{CI}}$ for a search space set $s_i<s_j$, or if there is a PDCCH candidate with index $m_{s_j,n_{CI}}$ and $m_{s_j,n_{CI}}<m_{s_j,n_{CI}}$ in the CORESET p on the active downlink BWP for the serving cell $n_{CI}$ using a same set of CCEs, the PDCCH candidates have identical scrambling, the corresponding DCI formats for the PDCCH candidates have a same size, and the PDCCH candidates correspond to the same TCI state(s); otherwise, the PDCCH candidate with index $m_{s_j,n_{CI}}$ may be counted for monitoring (e.g., towards a BD limit). Accordingly, the UE 115-a may treat these PDCCH candidates corresponding to different TCI state configurations as if they belong to different CORESETs 220. Alternatively, the UE 115-a may count these PDCCH candidates jointly towards the BD limit, regardless of the TCI state configurations.

Figure 3:
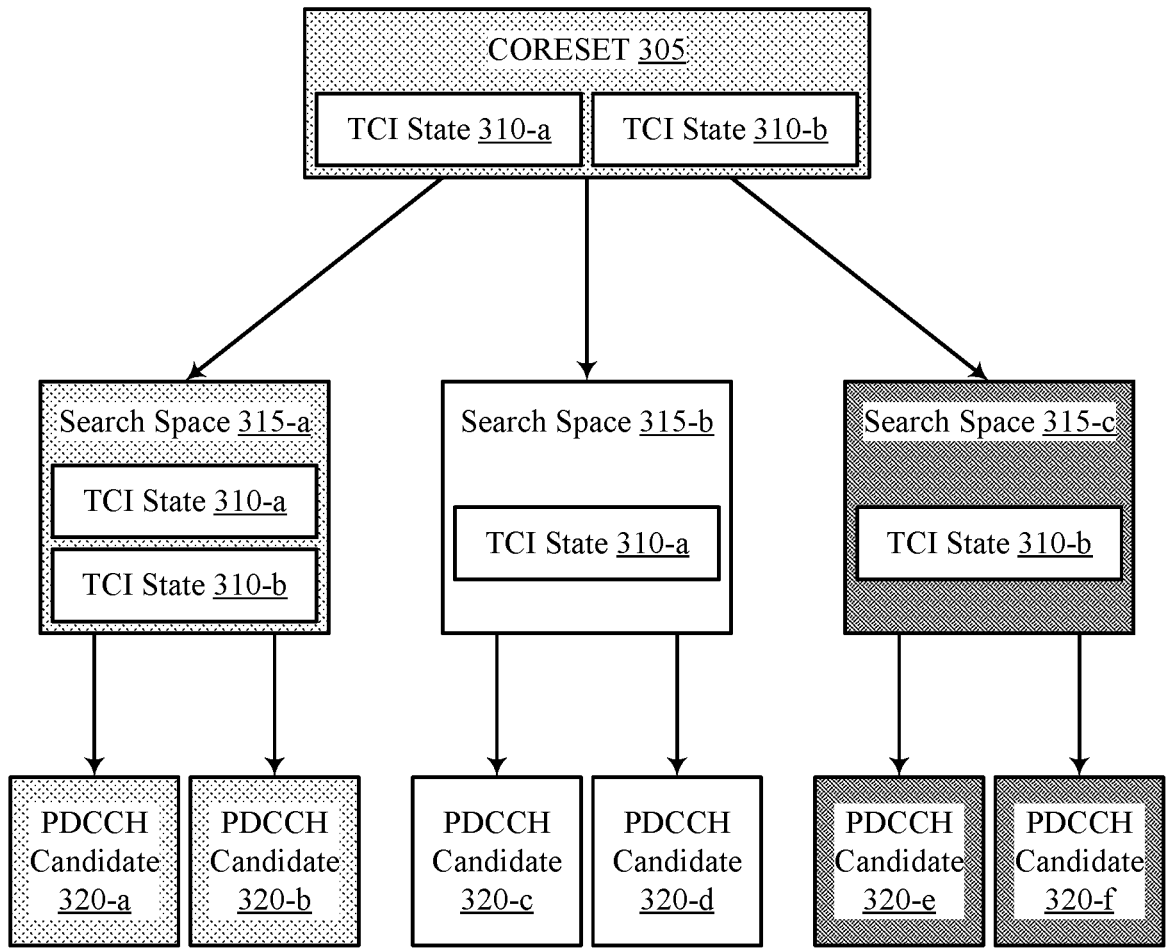
FIG. 3 illustrates examples of TCI state configurations supported by a CORESET configured with multiple TCI states in accordance with aspects of the present disclosure.

FIG. 3 illustrates examples of TCI state configurations 300 supported by a CORESET 305 configured with multiple TCI states in accordance with aspects of the present disclosure. In some examples, the CORESET 305 may be configured with multiple TCI states 310 (e.g., TCI state 310-a and TCI state 310-b). Additionally or alternatively, the CORESET 305 may be configure with one TCI state 310 or more than two TCI states 310. Additionally, as described herein, the search space sets 315 associated with the CORESET 305 may further be configurable based on the TCI states 310 for the CORESET 305. That is, a TCI state 310 may be configurable at the search space set 315 level.

As illustrated, a first search space set 315-a may be associated with the first TCI state 310-a and the second TCI state 310-b, a second search space set 315-b may be associated with the first TCI state 310-a, and a third search space set 315-c may be associated with the second TCI state 310-b. In some examples, any combination of such search space sets 315 may be associated with the CORESET 305. The PDCCH candidates 320 for a search space set 315 may be associated with the TCI state(s) 310 of the respective search space set 315. For example, a base station 105 may transmit DCI messages in PDCCH candidate 320-a and PDCCH candidate 320-b of the first search space set 315-a using both the first TCI state 310-a and the second TCI state 310-b. Additionally or alternatively, the base station 105 may transmit DCI messages in PDCCH candidate 320-c and PDCCH candidate 320-d of the second search space set 315-b using the first TCI state 310-a, and the base station 105-a may transmit DCI messages in PDCCH candidate 320-e and PDCCH candidate 320-f of the third search space set 315-c using the second TCI state 310-b.

Figure 4A:
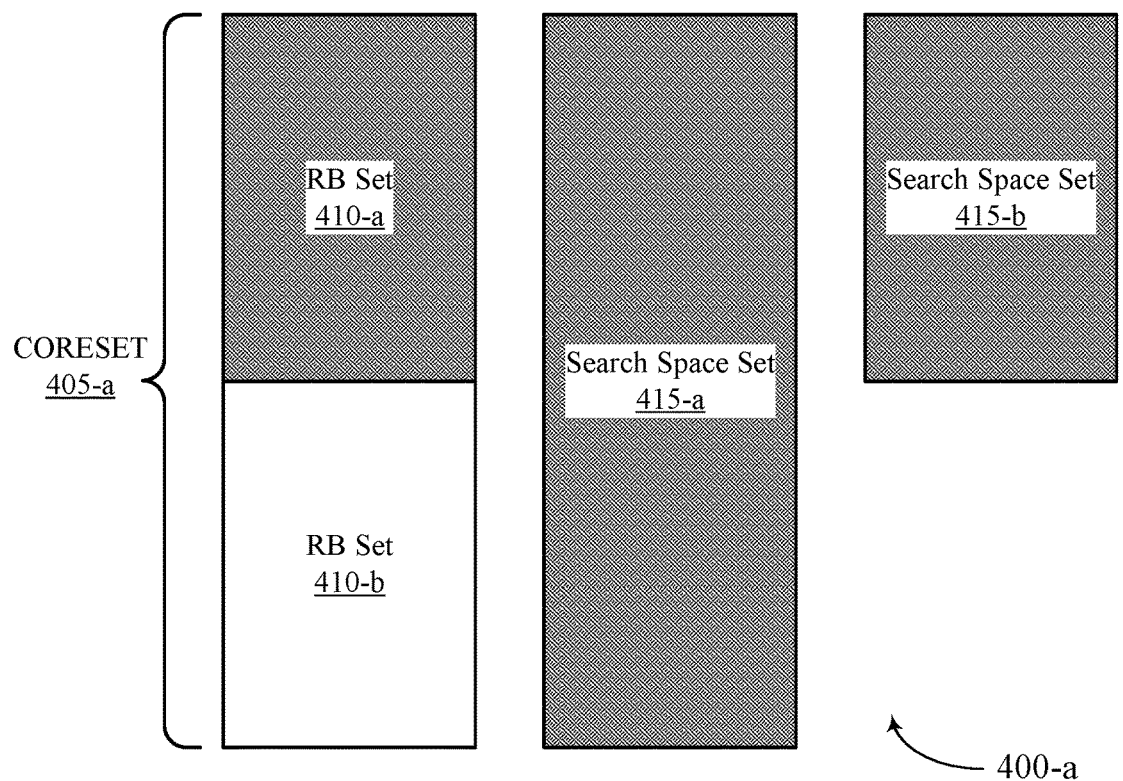
FIGS. 4A, 4B, and 5 illustrate examples of search space set configurations that support flexible handling of search space sets for CORESETs configured with multiple TCI states in accordance with aspects of the present disclosure.
Figure 4B:
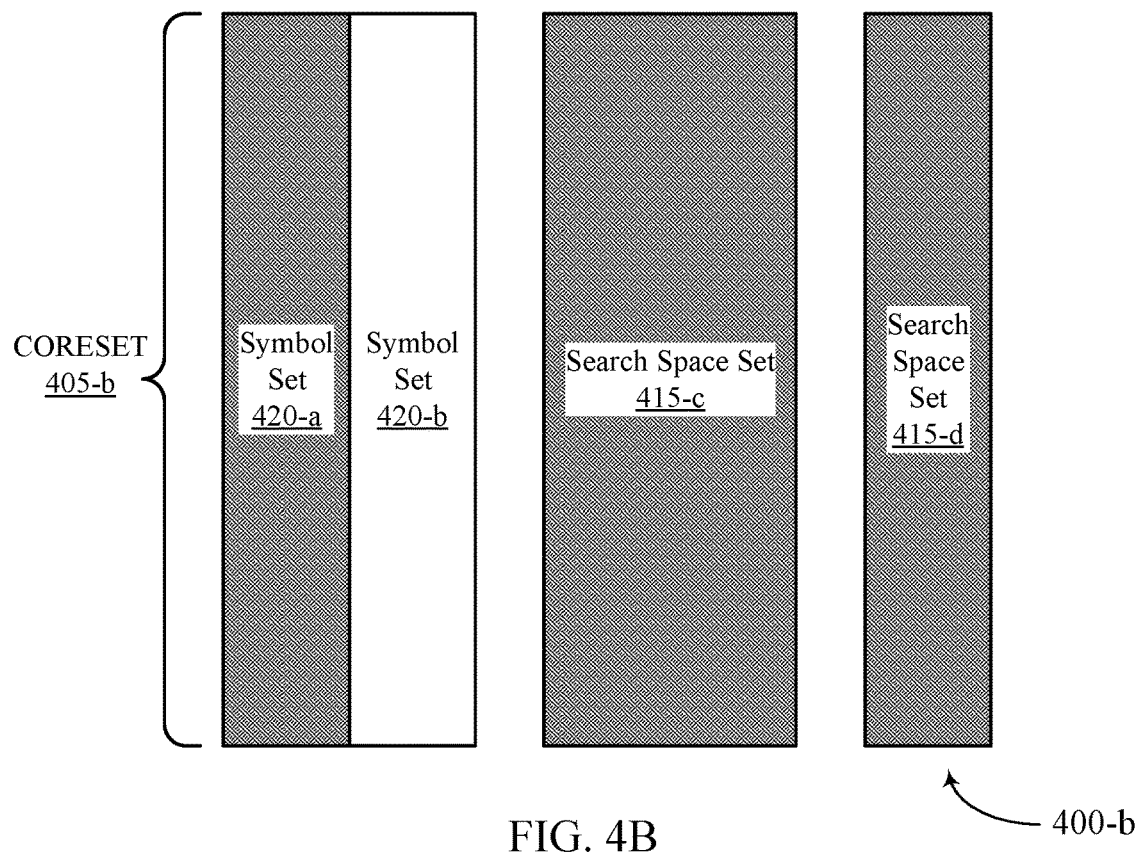

FIGS. 4A and 4B illustrate examples of search space set configurations 400 that support flexible handling of search space sets for CORESETs configured with multiple TCI states in accordance with aspects of the present disclosure. In some examples, as illustrated in FIG. 4A, a first search space set configuration 400-a may correspond to a CORESET 405-a configured with multiple TCI states in a frequency-division multiplexed (FDMed) manner. The CORESET 405-a may be configured by a base station 105 in a wireless communications system, as described herein with reference to FIGS. 1 through 3. In some examples, the base station 105 and a UE 115 configured with the CORESET 405-a may handle a search space set 415 associated with the CORESET 405-a based on the FDM configuration of the CORESET 405-a.

A first resource block (RB) set 410-a (e.g., set of frequency resources in the frequency domain) of the CORESET 405-a may be configured or activated with a first TCI state and a second RB set 410-b of the CORESET 405-a may be configured or activated with a second TCI state. The first RB set 410-a may be a contiguous set of RBs (e.g., in frequency) or split into multiple non-contiguous subsets of RBs, the second RB set 410-b may be a contiguous set of RBs or split into multiple non-contiguous subsets of RBs, or any combination thereof. In some cases, the first RB set 410-a and the second RB set 410-b may be interleaved in frequency. If a search space set 415 is associated with both TCI states of the CORESET 405-a, a PDCCH candidate (e.g., monitoring occasion) in the search space set 415 may have the first TCI state in the first RB set 410-a and the second TCI state in the second RB set 410-b.

However, if a search space set 415 is associated with a first TCI state of the CORESET 405-a, but not the other TCI state, a wireless device (e.g., a UE 115, base station 105, or both) may determine how the search space set 415 is associated with the RBs of the CORESET 405-a. In a first example, a search space set 415-a may be associated with all RBs of the CORESET 405-a (e.g., such that all RBs of the CORESET 405-a effectively have the first TCI state). A PDCCH monitoring occasion in the search space set 415-a associated with the first TCI state may span RBs in the first RB set 410-a, the second RB set 410-b, or any combination thereof and may have the first TCI state in the first RB set 410-a, the second RB set 410-b, or both. In a second example, a search space set 415-b may be associated with the RBs of the CORESET 405-a that correspond to the same TCI state (e.g., such that the first RB set 410-a of the CORESET 405-a has the first TCI state). A PDCCH monitoring occasion in the search space set 415-b associated with the first TCI state may span RBs in the first RB set 410-a and may have the first TCI state. In some such examples, the configuration of the CORESET 405-a may explicitly divide the RBs of the CORESET 405-a into two sets of RBs depending on the corresponding TCI state.

In some examples, as illustrated in FIG. 4B, a second search space set configuration 400-b may correspond to a CORESET 405-b configured with multiple TCI states in a time-division multiplexed (TDMed) manner. The CORESET 405-b may be configured by a base station 105 in a wireless communications system, as described herein with reference to FIGS. 1 through 3. In some examples, the base station 105 and a UE 115 configured with the CORESET 405-b may handle a search space set 415 associated with the CORESET 405-b based on the TDM configuration of the CORESET 405-b.

A first symbol set 420-a (e.g., set of OFDM symbols in the time domain) of the CORESET 405-b may be configured or activated with a first TCI state and a second symbol set 420-b of the CORESET 405-b may be configured or activated with a second TCI state. The first symbol set 420-a may be a contiguous set of symbols (e.g., in time) or split into multiple non-contiguous subsets of OFDM symbols (or other units of time), the second symbol set 420-b may be a contiguous set of symbols or split into multiple non-contiguous subsets of OFDM symbols (or other units of time), or any combination thereof. In some cases, the first symbol set 420-a and the second symbol set 420-b may be interleaved in time. If a search space set 415 is associated with both TCI states of the CORESET 405-b, a PDCCH candidate (e.g., monitoring occasion) in the search space set 415 may have the first TCI state in the first symbol set 420-a and the second TCI state in the second symbol set 420-b.

However, if a search space set 415 is associated with a first TCI state of the CORESET 405-b, but not the other TCI state, a wireless device (e.g., a UE 115, base station 105, or both) may determine how the search space set 415 is associated with the symbols of the CORESET 405-b. In a first example, a search space set 415-c may be associated with all symbols of the CORESET 405-b (e.g., such that all symbols of the CORESET duration effectively have the first TCI state). A PDCCH monitoring occasion in the search space set 415-c associated with the first TCI state may span symbols in the first symbol set 420-a, the second symbol set 420-b, or any combination thereof and may have the first TCI state in the first symbol set 420-a, the second symbol set 420-b, or both. In a second example, a search space set 415-d may be associated with the symbols of the CORESET 405-b that correspond to the same TCI state (e.g., such that the first symbol set 420-a of the CORESET 405-b has the first TCI state). A PDCCH monitoring occasion in the search space set 415-d associated with the first TCI state may span one or more symbols in the first symbol set 420-a and may have the first TCI state. In some such examples, the configuration of the CORESET 405-b may explicitly divide the symbols of the CORESET 405-b into two sets of symbols depending on the corresponding TCI state.

In some examples, a system may implement some combination of the first search space set configuration 400-a and the second search space set configuration 400-b. Additionally or alternatively, the system may support other configurations of FDMed resources, TDMed resources, or both, additional supported TCI states, or any combination thereof.

Figure 5:
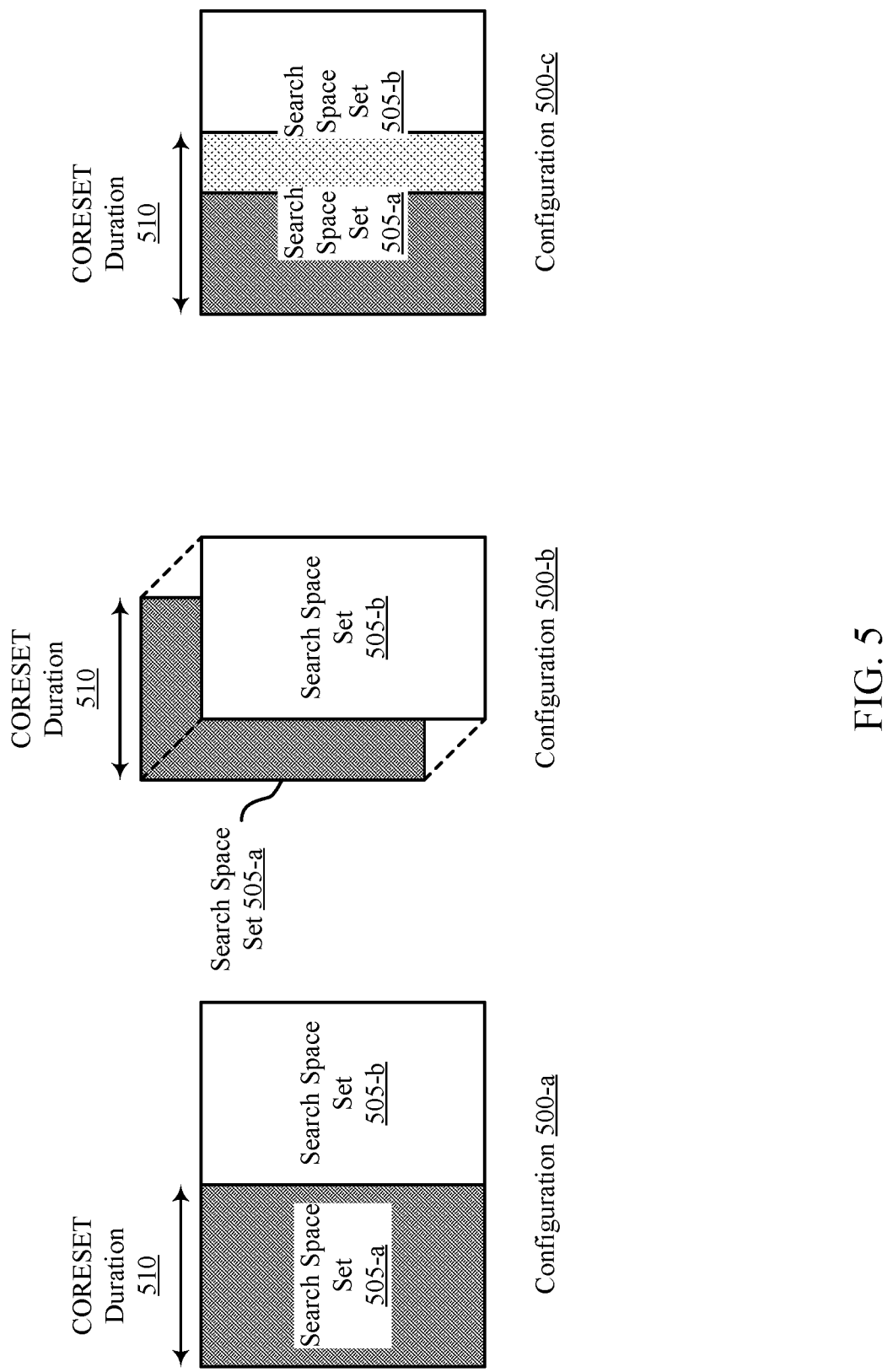

FIG. 5 illustrates examples of search space set configurations 500 that support flexible handling of search space sets for CORESETs configured with multiple TCI states in accordance with aspects of the present disclosure. In some examples, one or more of the search space set configurations 500 may be supported by a wireless communications system, as described herein with reference to FIGS. 1 through 3. For, a base station 105, as described herein with reference to FIGS. 1 and 2, may configure search space sets 505 according to one or more supported search space set configurations 500.

For example, two search space sets 505 may be associated with a CORESET that is activated with two TCI states. However, the two search space sets 505 may be associated with different TCI state configurations of the CORESET. For example, a first search space set 505-a may be associated with a first TCI state configuration (e.g., a first TCI state, a second TCI state, or both TCI states), while a second search space set 505-b may be associated with a second TCI state configuration (e.g., the first TCI state, the second TCI state, or both TCI states) different from the first TCI state configuration. In one example, the first search space set 505-a may be associated with both the first TCI state and the second TCI state, while the second search space set 505-b may be associated with the second TCI state (but not the first TCI state).

A base station 105 and a UE 115 may support one or more rules for determining how a search space set 505, a PDCCH candidate, or both may be configured when corresponding to different TCI state configurations of a same CORESET. Based on the one or more rules, the base station 105 may configure search space sets 505 and the UE 115 may receive DCI in monitoring occasions of the search space sets 505.

In a first example, search space sets 505 (e.g., PDCCH monitoring occasions) of a CORESET corresponding to different TCI state configurations may not overlap in the time domain. For example, the base station 105 and UE 115 may support a search space set configuration 500-a, where the search space set 505-b starts at least a CORESET duration 510 after the search space set 505-a starts in the time domain. In such a configuration, a UE 115 may not expect any two PDCCH monitoring occasions on an active downlink BWP, for different search space sets corresponding to different TCI state configurations, in a same CORESET to be separated by a number (e.g., zero or a non-zero number) of symbols that is smaller than the CORESET duration 510.

In a second example, search space sets 505 (e.g., PDCCH monitoring occasions) of a CORESET corresponding to different TCI state configurations may be non-overlapping or fully overlapping in the time domain. For example, the base station 105 and UE 115 may support a search space set configuration 500-a and a search space set configuration 500-b, where the search space set 505-b either starts at least a CORESET duration 510 after the search space set 505-a starts in the time domain or starts at a same symbol in the time domain as the search space set 505-a. In such a configuration, a UE 115 may not expect any two PDCCH monitoring occasions on an active downlink BWP, for different search space sets corresponding to different TCI state configurations, in a same CORESET to be separated by a non-zero number of symbols that is smaller than the CORESET duration 510.

In a third example, search space sets 505 (e.g., PDCCH monitoring occasions) of a CORESET corresponding to different TCI state configurations may be non-overlapping, partially overlapping, or fully overlapping in the time domain. For example, the base station 105 and UE 115 may support a search space set configuration 500-a, a search space set configuration 500-b, and a search space set configuration 500-c, where the search space set 505-b may start at the same time as the search space set 505-a or any time after the search space set 505-a (e.g., regardless of the CORESET duration 510). In such a configuration, a UE 115 may handle different search space sets corresponding to different TCI state configurations but corresponding to a same CORESET as if the search space sets correspond to different CORESETs (e.g., for purposes of configuring the search space sets in time).

Accordingly, based on one or more defined rules at a base station 105, a UE 115, or both, search space sets 505 associated with a same CORESET but corresponding to different TCI state configurations may be configured in the time domain according to the search space set configuration 500-a, the search space set configuration 500-a or the search space set configuration 500-b, or the search space set configuration 500-a, the search space set configuration 500-b, or the search space set configuration 500-c. Additionally or alternatively, other combinations of configurations may be supported by a wireless communications system.

Figure 6:
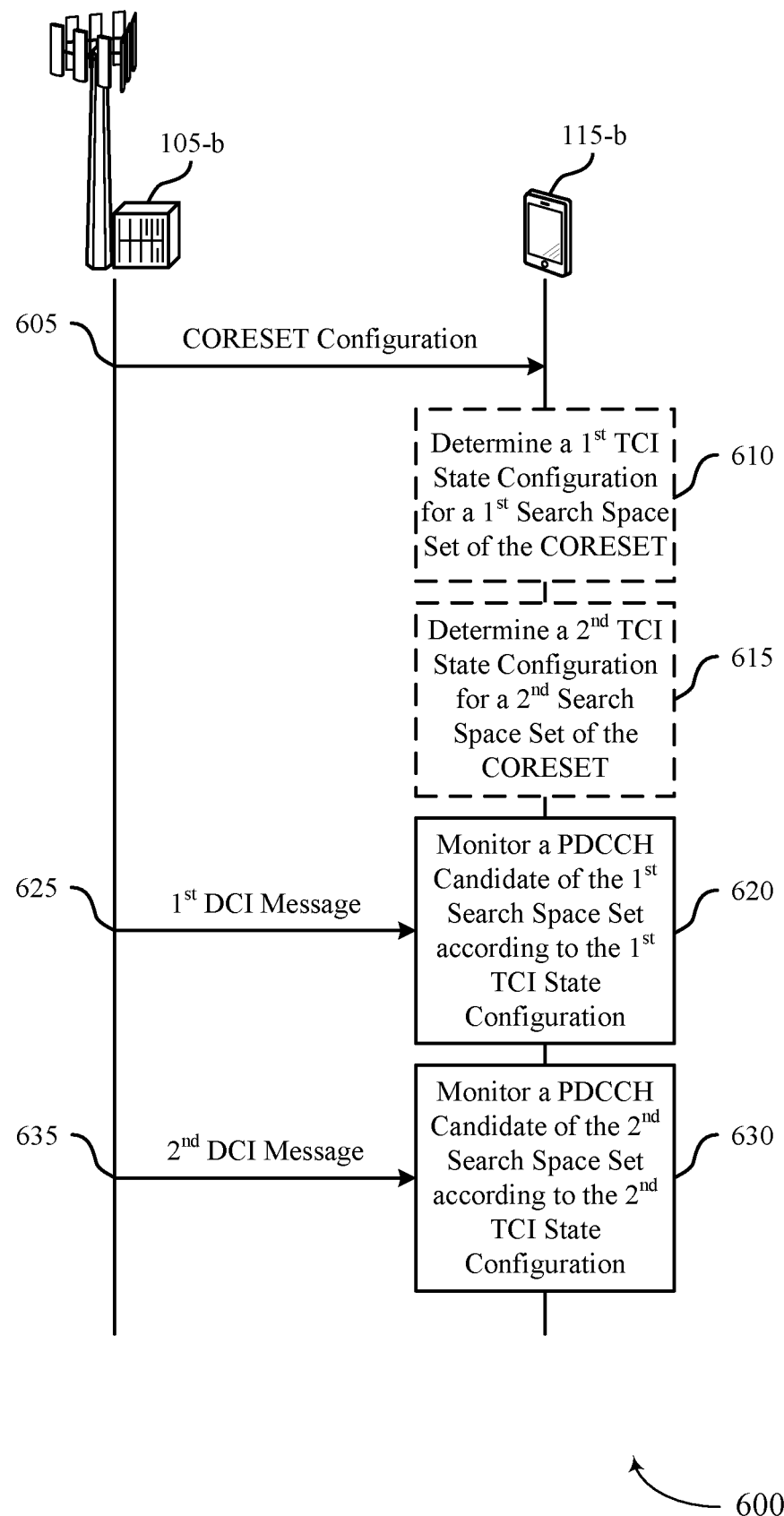
FIG. 6 illustrates an example of a process flow that supports flexible handling of search space sets for CORESETs configured with multiple TCI states in accordance with aspects of the present disclosure.

FIG. 6 illustrates an example of a process flow 600 that supports flexible handling of search space sets for CORESETs configured with multiple TCI states in accordance with aspects of the present disclosure. In some examples, the process flow 600 may implement aspects of a wireless communications system 100 or 200 as described herein. For example, the process flow 600 may include a base station 105-b and a UE 115-b, which may be examples of the corresponding devices described with reference to FIGS. 1 and 2. The base station 105-b may configure the UE 115-b with a CORESET associated with multiple TCI states and one or more search space sets associated with the CORESET and one or more of the multiple TCI states. Alternative examples of the following may be implemented, where some steps are performed in a different order than described or are not performed at all. In some cases, steps may include additional features not mentioned below, or further steps may be added.

At 605, a base station 105-*b* may transmit a CORESET configuration message to a UE 115-*b*. The CORESET configuration message may be an example of an RRC message configuring a CORESET or a MAC-CE activating a CORESET. The CORESET may be configured with both a first TCI state and a second TCI state.

At 610, the UE 115-*b* may determine a first TCI state configuration for a first search space set of the CORESET. In some examples, the UE 115-*b* may receive, from the base station 105-*b*, an RRC message configuring the first search space set with the CORESET and the first TCI state configuration. In some other examples, the UE 115-*b* may receive, from the base station 105-*b*, a MAC-CE indicating a first ID for the first search space set, an association between the first search space set and the CORESET, and a first TCI state configuration for the first search space set. In some cases, the CORESET configuration message received at 605 may further configure the first search space set of the CORESET. Alternatively, the UE 115-*b* may determine the first TCI state configuration for the first search space set based on the first search space set being associated with the CORESET configured with both the first TCI state and the second TCI state. For example, if the UE 115-*b* determines an absence of a TCI state configuration configured by the base station 105-*b* for the first set search space set (e.g., the base station 105-*b* does not transmit an RRC message or MAC-CE indicating a TCI state configuration for the first search space set), the UE 115-*b* may implement a default configuration for the first search space set. In a first example, the default configuration may configure the first search space set with the first TCI state of the CORESET. In a second example, the default configuration may configure the first search space set with the both first TCI state and the second TCI state of the CORESET.

At 615, the UE 115-*b* may determine a second TCI state configuration for a second search space set of the CORESET. The second TCI state configuration may be different from the first TCI state configuration. For example, the first TCI state configuration and the second TCI state configuration may correspond to different combinations of one or more TCI states. In some examples, the UE 115-*b* may receive, from the base station 105-*b*, an RRC message configuring the second search space set with the CORESET and the second TCI state configuration. In some other examples, the UE 115-*b* may receive, from the base station 105-*b*, a MAC-CE indicating a second ID for the second search space set, an association between the second search space set and the CORESET, and a second TCI state configuration for the second search space set. In some cases, the CORESET configuration message received at 605 may further configure the second search space set of the CORESET. Alternatively, the UE 115-*b* may determine the second TCI state configuration of the second search space set based on a default configuration (e.g., if the base station 105-*b* does not transmit an RRC message or MAC-CE indicating a TCI state configuration for the second search space set).

At 620, the UE 115-*b* may monitor for a first DCI message in a first PDCCH candidate of the first search space of the CORESET according to the first TCI state configuration. The first TCI state configuration may indicate that the first search space set is associated with the first TCI state, the second TCI state, or both. In some cases, at 625, the base station 105-*b* may transmit a first DCI message in the first PDCCH candidate of the first search space set of the CORESET according to the first TCI state configuration.

At 630, the UE 115-*b* may monitor for a second DCI message in a second PDCCH candidate of the second search space of the CORESET according to the second TCI state configuration. The second TCI state configuration may indicate that the second search space set is associated with the first TCI state, the second TCI state, or both. In some cases, at 635, the base station 105-*b* may transmit a second DCI message in the second PDCCH candidate of the second search space set of the CORESET according to the second TCI state configuration. In this way, the base station 105-*b* may transmit, and the UE 115-*b* may receive, DCI messages associated with different TCI state configurations in a single CORESET, improving the flexibility of the system.

Figure 7:
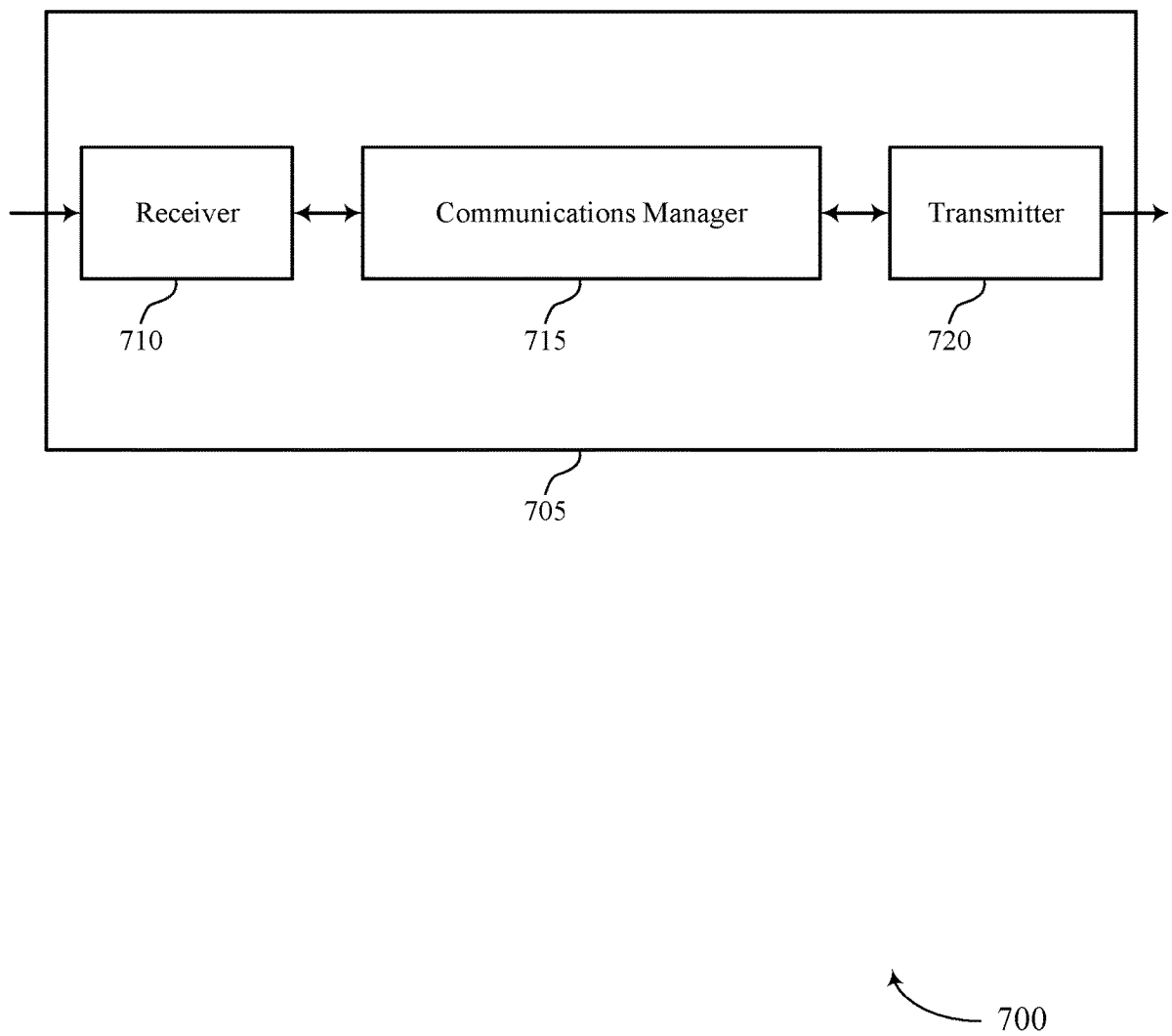
FIGS. 7 and 8 show block diagrams of devices that support flexible handling of search space sets for CORESETs configured with multiple TCI states in accordance with aspects of the present disclosure.

FIG. 7 shows a block diagram 700 of a device 705 that supports flexible handling of search space sets for CORESETs configured with multiple TCI states in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, information channels related to flexible handling of search space sets for CORESETs configured with multiple TCI states). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive an indication of a CORESET configured with both a first TCI state and a second TCI state. The communications manager 715 may monitor for a first DCI message in a first PDCCH candidate of a first search space set of the CORESET according to a first TCI state configuration which indicates that the first search space set is associated with the first TCI state, the second TCI state, or both. Additionally, the communications manager 715 may monitor for a second DCI message in a second PDCCH candidate of a second search space set of the CORESET according to a second TCI state configuration which indicates that the second search space set is associated with the first TCI state, the second TCI state, or both, where the second TCI state configuration is different from the first TCI state configuration. The communications manager 715 may be an example of aspects of the communications manager 1010 described herein.

The actions performed by the communications manager 715 as described herein may be implemented to realize one or more potential advantages. For example, supporting PDCCH candidates with different TCI state configurations in a single CORESET configured with multiple TCI state configurations may improve the network flexibility. For example, a UE 115 may be configured with a single CORESET but may receive DCI messages in the CORESET according to different TCI state configurations. As such, the UE 115 may receive DCI messages according to different TCI states without a significant increase in configuration overhead or the number of CORESETs configured at the UE 115. Furthermore, additional options for TCI state configurations may improve the reliability of DCI receptions (e.g., as opposed to receiving according to a single TCI state configuration for a CORESET), improving communication reliability and reducing communication latency between a base station and the UE 115.

Based on supporting PDCCH candidates with different TCI state configurations in a single CORESET, a processor of the device 705 (e.g., a processor controlling the receiver 710, the communications manager 715, the transmitter 720, or a combination thereof) may reduce processing resources used for CORESET configuration, DCI reception, or both. For example, by supporting multiple TCI state combinations in a single CORESET, the device 705 may reduce the number of times the processor ramps up processing power and turns on processing units to handle CORESET configuration in order to support PDCCH candidates with multiple TCI state configurations. Additionally or alternatively, by supporting DCI reception using multiple different TCI state configurations, the device 705 may improve the reliability of DCI reception and reduce the number of times the processor ramps up processing power and turns on processing units to handle DCI reception.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
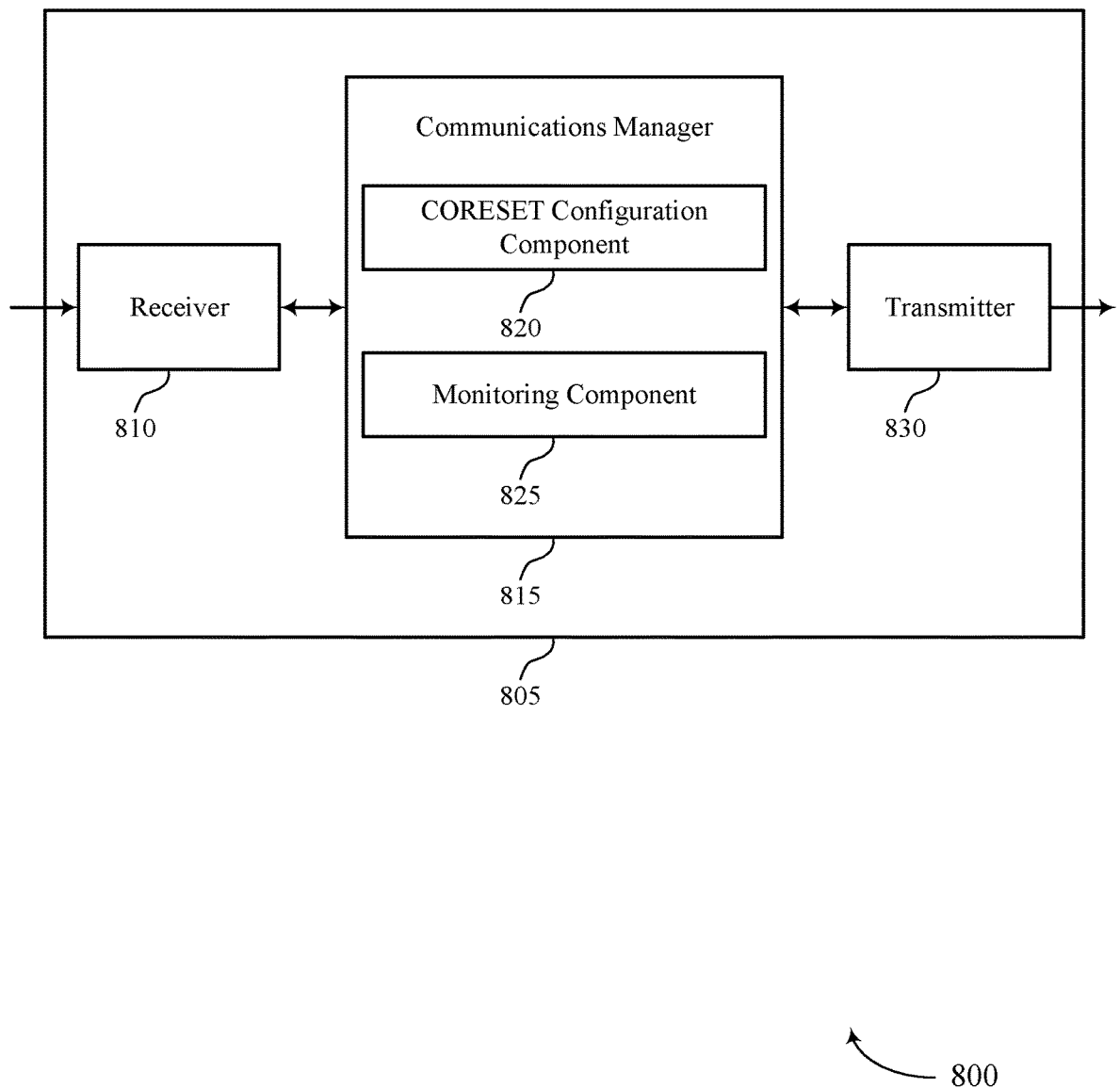

FIG. 8 shows a block diagram 800 of a device 805 that supports flexible handling of search space sets for CORESETs configured with multiple TCI states in accordance with aspects of the present disclosure. The device 805 may be an example of aspects of a device 705 or a UE 115 as described herein. The device 805 may include a receiver 810, a communications manager 815, and a transmitter 830. The device 805 may also include a processor. Each of these components may be in communication with one another (e.g., via one or more buses).

The receiver 810 may receive information such as packets, user data, or control information associated with various information channels (e.g., control channels, data channels, information channels related to flexible handling of search space sets for CORESETs configured with multiple TCI states). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a CORESET configuration component 820 and a monitoring component 825. The communications manager 815 may be an example of aspects of the communications manager 1010 described herein.

The CORESET configuration component 820 may receive an indication of a CORESET configured with both a first TCI state and a second TCI state. The monitoring component 825 may monitor for a first DCI message in a first PDCCH candidate of a first search space set of the CORESET according to a first TCI state configuration which indicates that the first search space set is associated with the first TCI state, the second TCI state, or both. The monitoring component 825 may further monitor for a second DCI message in a second PDCCH candidate of a second search space set of the CORESET according to a second TCI state configuration which indicates that the second search space set is associated with the first TCI state, the second TCI state, or both, where the second TCI state configuration is different from the first TCI state configuration.

The transmitter 830 may transmit signals generated by other components of the device 805. In some examples, the transmitter 830 may be collocated with a receiver 810 in a transceiver module. For example, the transmitter 830 may be an example of aspects of the transceiver 1020 described with reference to FIG. 10. The transmitter 830 may utilize a single antenna or a set of antennas.

Figure 9:
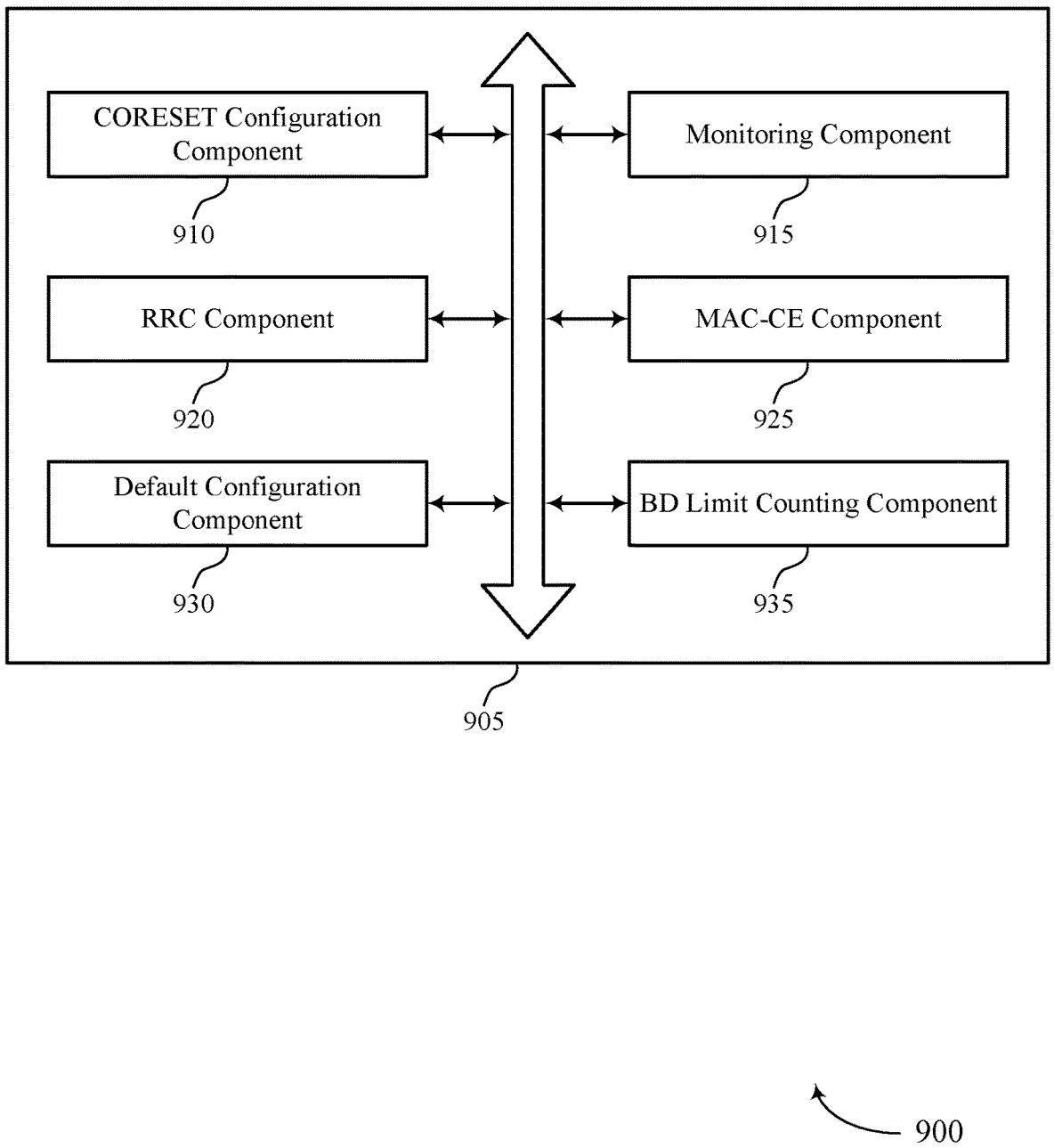
FIG. 9 shows a block diagram of a communications manager that supports flexible handling of search space sets for CORESETs configured with multiple TCI states in accordance with aspects of the present disclosure.

FIG. 9 shows a block diagram 900 of a communications manager 905 that supports flexible handling of search space sets for CORESETs configured with multiple TCI states in accordance with aspects of the present disclosure. The communications manager 905 may be an example of aspects of a communications manager 715, a communications manager 815, or a communications manager 1010 described herein. The communications manager 905 may include a CORESET configuration component 910, a monitoring component 915, an RRC component 920, a MAC-CE component 925, a default configuration component 930, and a BD limit counting component 935. Each of these components may communicate, directly or indirectly, with one another (e.g., via one or more buses).

The communications manager 905 may be implemented at a UE. The CORESET configuration component 910 may receive an indication of a CORESET configured with both a first TCI state and a second TCI state.

The monitoring component 915 may monitor for a first DCI message in a first PDCCH candidate of a first search space set of the CORESET according to a first TCI state configuration which indicates that the first search space set is associated with the first TCI state, the second TCI state, or both. The monitoring component 915 may further monitor for a second DCI message in a second PDCCH candidate of a second search space set of the CORESET according to a second TCI state configuration which indicates that the second search space set is associated with the first TCI state, the second TCI state, or both, where the second TCI state configuration is different from the first TCI state configuration.

The RRC component 920 may receive an RRC message configuring the first search space set with the CORESET and the first TCI state configuration, the second search space set with the CORESET and the second TCI state configuration, or a combination thereof. In some examples, the RRC component 920 may receive an RRC message configuring the CORESET with both the first TCI state and the second TCI state.

The MAC-CE component 925 may receive a MAC-CE indicating a first ID for the first search space set, an association between the first search space set and the CORESET, and the first TCI state configuration for the first search space set; a second ID for the second search space set, an association between the second search space set and the CORESET, and the second TCI state configuration for the second search space set; or a combination thereof. In some examples, the MAC-CE component 925 may receive a MAC-CE activating the CORESET with both the first TCI state and the second TCI state.

The default configuration component 930 may determine the first TCI state configuration for the first search space set based on the first search space set being associated with the CORESET configured with both the first TCI state and the second TCI state. In some examples, the default configuration component 930 may determine an absence of a TCI state configuration configured by a base station for the first search space set, where the first TCI state configuration is determined based on the determined absence. In a first example, the default configuration component 930 may determine that the first search space set is associated with the first TCI state based on the determined absence and the first search space set being associated with the CORESET configured with both the first TCI state and the second TCI state. In a second example, the default configuration component 930 may determine that the first search space set is associated with both the first TCI state and the second TCI state based on the determined absence and the first search space set being associated with the CORESET configured with both the first TCI state and the second TCI state.

In some examples, the CORESET includes a set of RBs, the set of RBs including a first set of RBs configured with the first TCI state and a second set of RBs configured with the second TCI state, and the first TCI state configuration may include the first TCI state but not the second TCI state. In some such examples, the first search space set may be associated with the full set of RBs of the CORESET, where monitoring for the first DCI message in the first PDCCH candidate of the first search space set may include the monitoring component 915 monitoring for the first DCI message in the first PDCCH candidate of the first search space set according to the first TCI state for the set of RBs based on the first search space set being associated with the set of RBs of the CORESET. In some other such examples, the first search space set may be associated with the first set of RBs configured with the first TCI state based on the first TCI state configuration including the first TCI state but not the second TCI state, where monitoring for the first DCI message in the first PDCCH candidate of the first search space set may include the monitoring component 915 monitoring for the first DCI message in the first PDCCH candidate of the first search space set according to the first TCI state for the first set of RBs based on the first search space set being associated with the first set of RBs of the CORESET.

In some examples, the CORESET includes a set of symbols, the set of symbols including a first set of symbols configured with the first TCI state and a second set of symbols configured with the second TCI state, and the first TCI state configuration may include the first TCI state but not the second TCI state. In some such examples, the first search space set may be associated with the full set of symbols of the CORESET, where monitoring for the first DCI message in the first PDCCH candidate of the first search space set may include the monitoring component 915 monitoring for the first DCI message in the first PDCCH candidate of the first search space set according to the first TCI state for the set of symbols based on the first search space set being associated with the set of symbols of the CORESET. In some other such examples, the first search space set may be associated with the first set of symbols configured with the first TCI state based on the first TCI state configuration including the first TCI state but not the second TCI state, where monitoring for the first DCI message in the first PDCCH candidate of the first search space set may include the monitoring component 915 monitoring for the first DCI message in the first PDCCH candidate of the first search space set according to the first TCI state for the first set of symbols based on the first search space set being associated with the first set of symbols of the CORESET.

In some cases, the first PDCCH candidate and the second PDCCH candidate may be non-overlapping in a time domain. In some other cases, the first PDCCH candidate and the second PDCCH candidate may be non-overlapping in the time domain, partially overlapping in the time domain, or fully overlapping in the time domain.

In some cases, the first PDCCH candidate and the second PDCCH candidate may use a same set of CCEs of the CORESET, and the first PDCCH candidate may correspond to a first DCI format and the second PDCCH candidate may correspond to a second DCI format, the first DCI format having a same size as the second DCI format. In some such cases, the BD limit counting component 935 may count the first PDCCH candidate and the second PDCCH candidate separately towards a BD limit based on the second TCI state configuration being different from the first TCI state configuration. In some other such cases, the BD limit counting component 935 may count the first PDCCH candidate and the second PDCCH candidate jointly towards a BD limit based on the first PDCCH candidate and the second PDCCH candidate using the same set of CCEs and the first DCI format having the same size as the second DCI format.

Figure 10:
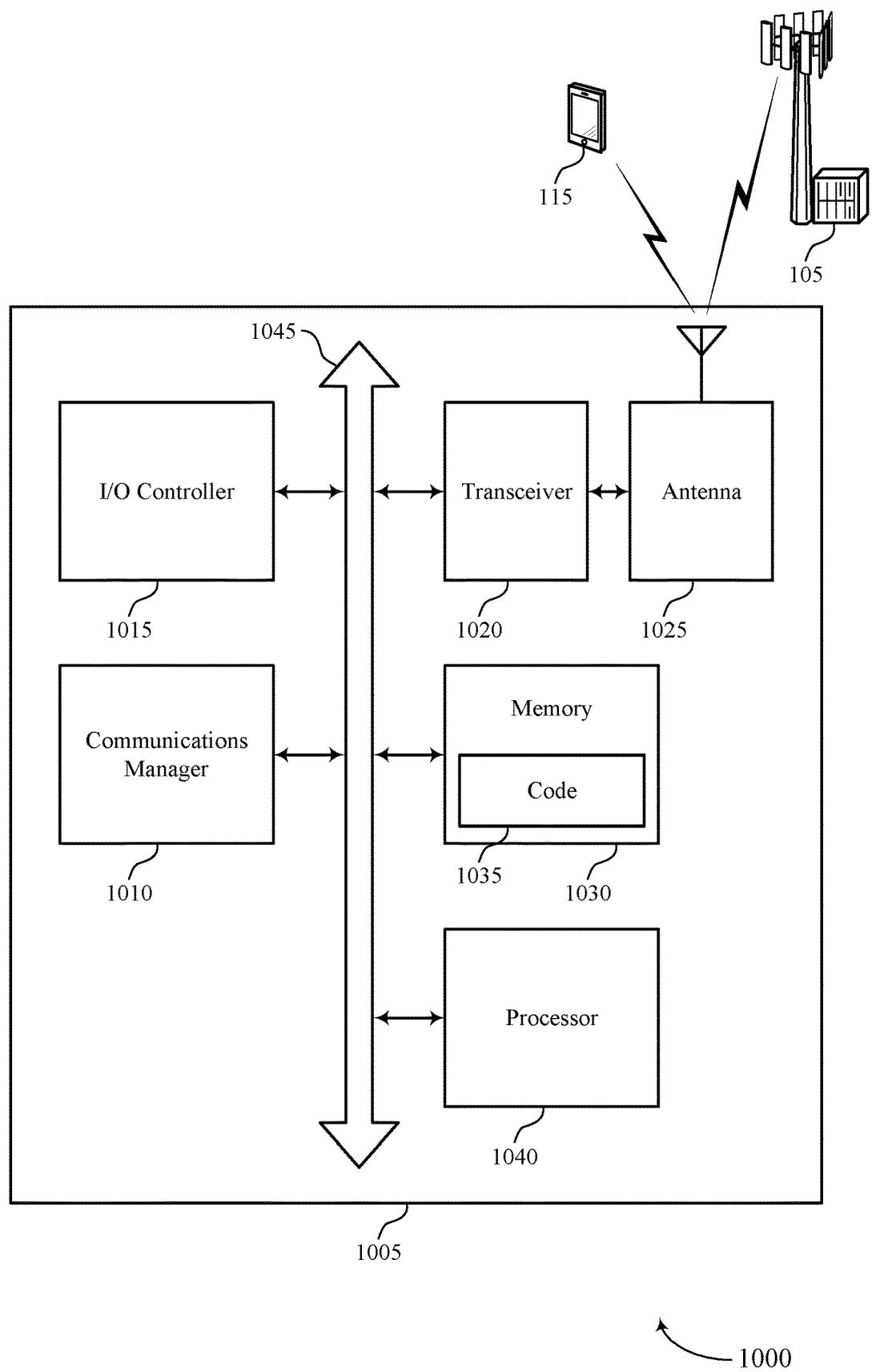
FIG. 10 shows a diagram of a system including a device that supports flexible handling of search space sets for CORESETs configured with multiple TCI states in accordance with aspects of the present disclosure.

FIG. 10 shows a diagram of a system 1000 including a device 1005 that supports flexible handling of search space sets for CORESETs configured with multiple TCI states in accordance with aspects of the present disclosure. The device 1005 may be an example of or include the components of a device 705, a device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive an indication of a CORESET configured with both a first TCI state and a second TCI state. The communications manager 1010 may monitor for a first DCI message in a first PDCCH candidate of a first search space set of the CORESET according to a first TCI state configuration which indicates that the first search space set is associated with the first TCI state, the second TCI state, or both. Additionally, the communications manager 1010 may monitor for a second DCI message in a second PDCCH candidate of a second search space set of the CORESET according to a second TCI state configuration which indicates that the second search space set is associated with the first TCI state, the second TCI state, or both, where the second TCI state configuration is different from the first TCI state configuration. In some examples, the communications manager 1010 may be configured to perform various operations (e.g., receiving, monitoring, transmitting) using or otherwise in cooperation with the transceiver 1020, the one or more antennas 1025, or any combination thereof. For example, the communications manager 1010 may be configured to receive or transmit messages or other signaling as described herein via the transceiver 1020.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting flexible handling of search space sets for CORESETs configured with multiple TCI states).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
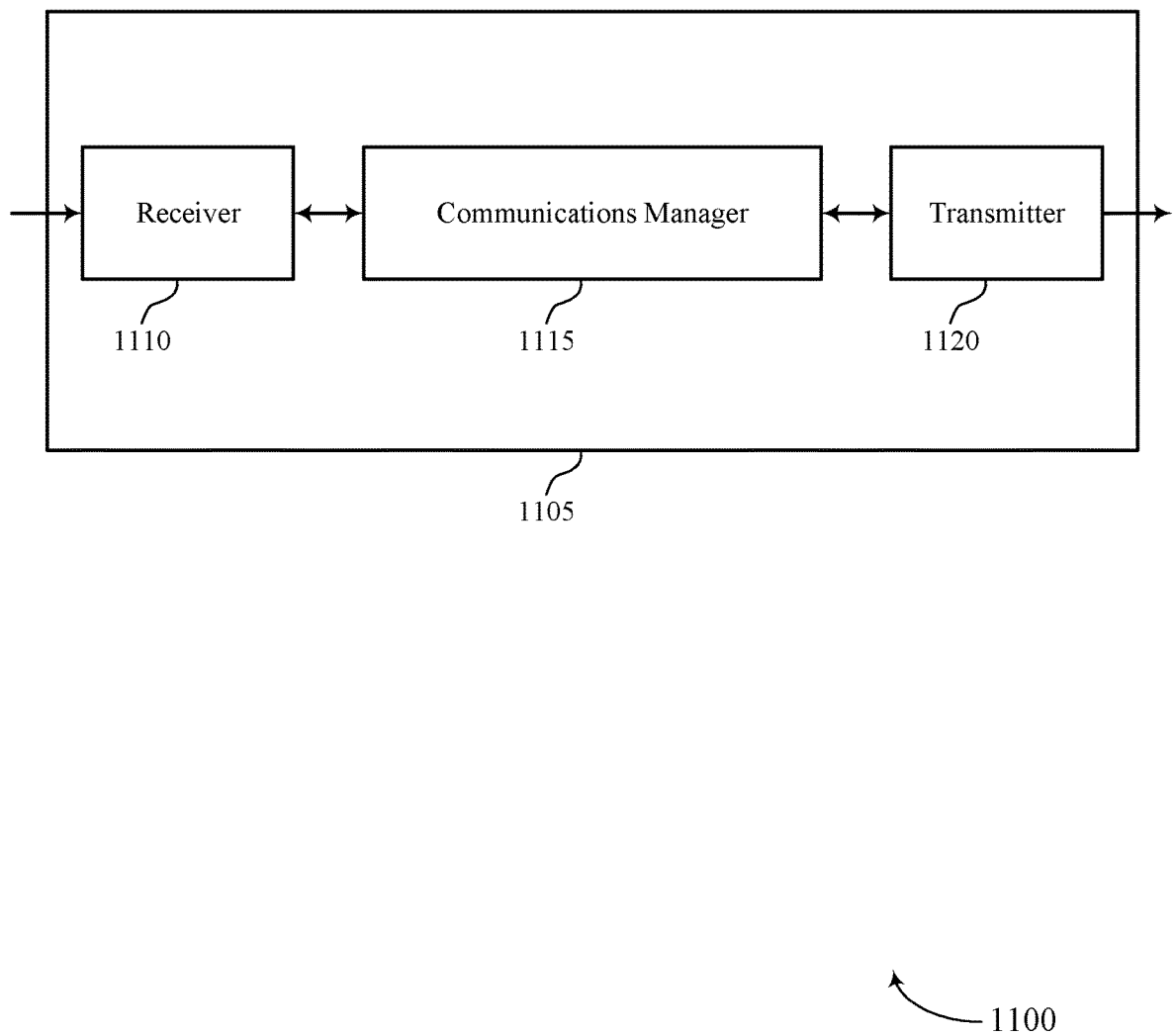
FIGS. 11 and 12 show block diagrams of devices that support flexible handling of search space sets for CORESETs configured with multiple TCI states in accordance with aspects of the present disclosure.

FIG. 11 shows a block diagram 1100 of a device 1105 that supports flexible handling of search space sets for CORESETs configured with multiple TCI states in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, information channels related to flexible handling of search space sets for CORESETs configured with multiple TCI states). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may configure a CORESET with both a first TCI state and a second TCI state. The communications manager 1115 may transmit a first DCI message in a first PDCCH candidate of a first search space set of the CORESET according to a first TCI state configuration which indicates that the first search space set is associated with the first TCI state, the second TCI state, or both. Additionally, the communications manager 1115 may transmit a second DCI message in a second PDCCH candidate of a second search space set of the CORESET according to a second TCI state configuration which indicates that the second search space set is associated with the first TCI state, the second TCI state, or both, where the second TCI state configuration is different from the first TCI state configuration. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
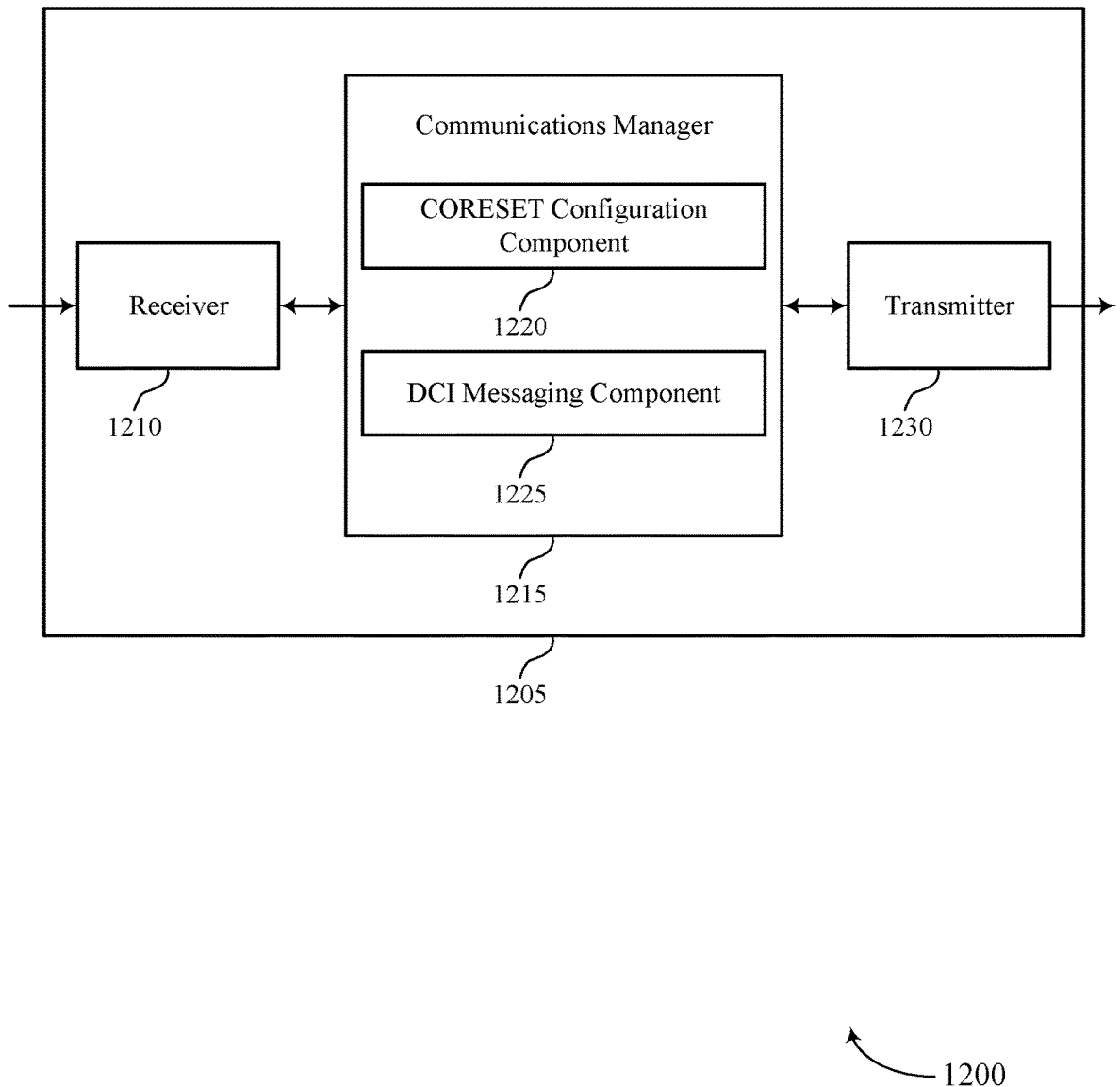

FIG. 12 shows a block diagram 1200 of a device 1205 that supports flexible handling of search space sets for CORESETs configured with multiple TCI states in accordance with aspects of the present disclosure. The device 1205 may be an example of aspects of a device 1105 or a base station 105 as described herein. The device 1205 may include a receiver 1210, a communications manager 1215, and a transmitter 1230. The device 1205 may also include a processor. Each of these components may be in communication with one another (e.g., via one or more buses).

The receiver 1210 may receive information such as packets, user data, or control information associated with various information channels (e.g., control channels, data channels, information channels related to flexible handling of search space sets for CORESETs configured with multiple TCI states). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a CORESET configuration component 1220 and a DCI messaging component 1225. The communications manager 1215 may be an example of aspects of the communications manager 1410 described herein.

The CORESET configuration component 1220 may configure a CORESET with both a first TCI state and a second TCI state. The DCI messaging component 1225 may transmit a first DCI message in a first PDCCH candidate of a first search space set of the CORESET according to a first TCI state configuration which indicates that the first search space set is associated with the first TCI state, the second TCI state, or both. The DCI messaging component 1225 may further transmit a second DCI message in a second PDCCH candidate of a second search space set of the CORESET according to a second TCI state configuration which indicates that the second search space set is associated with the first TCI state, the second TCI state, or both, where the second TCI state configuration is different from the first TCI state configuration.

The transmitter 1230 may transmit signals generated by other components of the device 1205. In some examples, the transmitter 1230 may be collocated with a receiver 1210 in a transceiver module. For example, the transmitter 1230 may be an example of aspects of the transceiver 1420 described with reference to FIG. 14. The transmitter 1230 may utilize a single antenna or a set of antennas.

Figure 13:
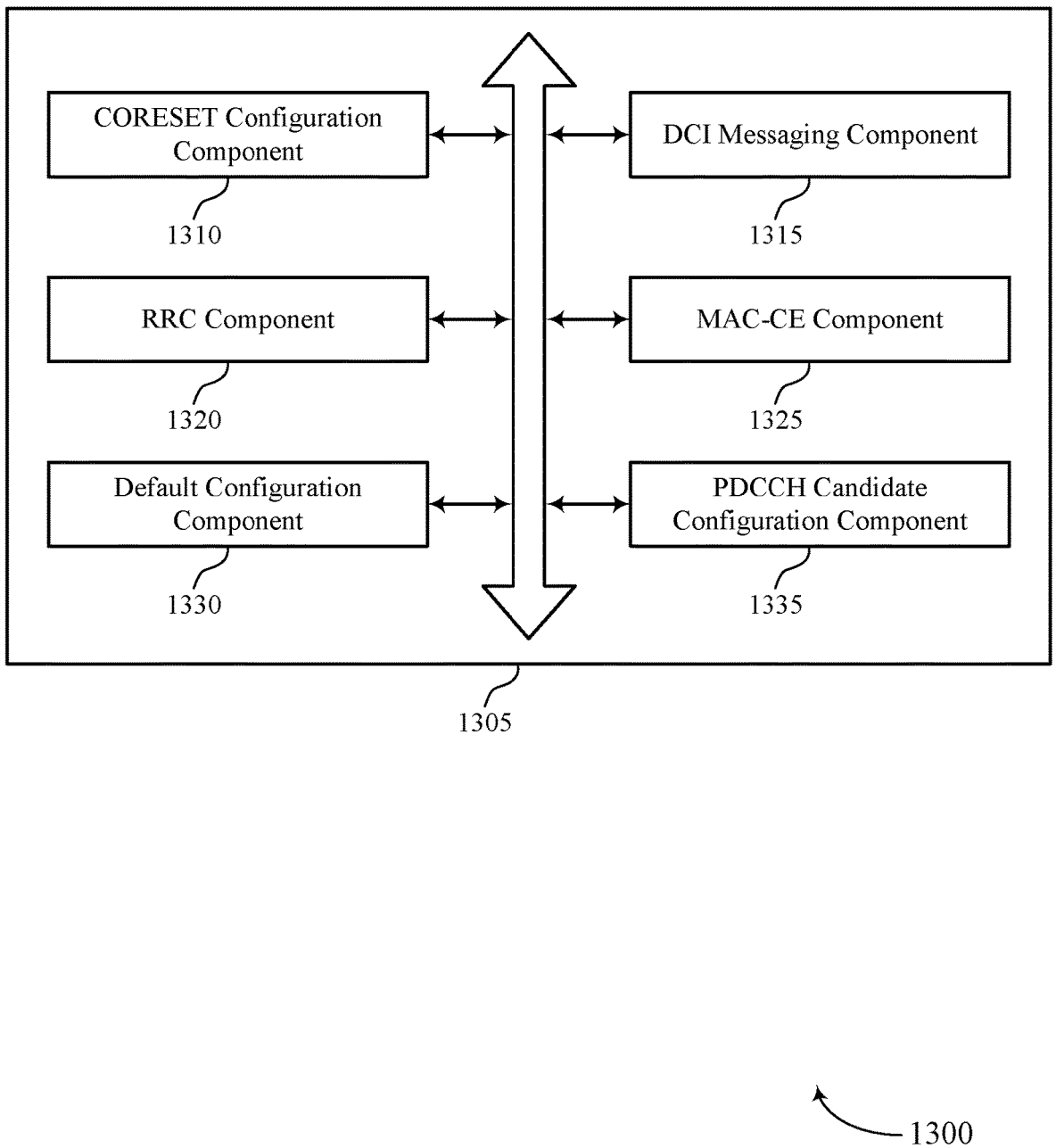
FIG. 13 shows a block diagram of a communications manager that supports flexible handling of search space sets for CORESETs configured with multiple TCI states in accordance with aspects of the present disclosure.

FIG. 13 shows a block diagram 1300 of a communications manager 1305 that supports flexible handling of search space sets for CORESETs configured with multiple TCI states in accordance with aspects of the present disclosure. The communications manager 1305 may be an example of aspects of a communications manager 1115, a communications manager 1215, or a communications manager 1410 described herein. The communications manager 1305 may include a CORESET configuration component 1310, a DCI messaging component 1315, an RRC component 1320, a MAC-CE component 1325, a default configuration component 1330, and a PDCCH candidate configuration component 1335. Each of these components may communicate, directly or indirectly, with one another (e.g., via one or more buses).

The communications manager 1305 may be implemented at a base station. The CORESET configuration component 1310 may configure a CORESET with both a first TCI state and a second TCI state.

The DCI messaging component 1315 may transmit a first DCI message in a first PDCCH candidate of a first search space set of the CORESET according to a first TCI state configuration which indicates that the first search space set is associated with the first TCI state, the second TCI state, or both. The DCI messaging component 1315 may further transmit a second DCI message in a second PDCCH candidate of a second search space set of the CORESET according to a second TCI state configuration which indicates that the second search space set is associated with the first TCI state, the second TCI state, or both, where the second TCI state configuration is different from the first TCI state configuration.

The RRC component 1320 may transmit an RRC message configuring the first search space set with the CORESET and the first TCI state configuration, the second search space set with the CORESET and the second TCI state configuration, or a combination thereof. In some examples, the RRC component 1320 may transmit an RRC message configuring the CORESET with both the first TCI state and the second TCI state.

The MAC-CE component 1325 may transmit a MAC-CE indicating a first ID for the first search space set, an association between the first search space set and the CORESET, and the first TCI state configuration for the first search space set; a second ID for the second search space set, an association between the second search space set and the CORESET, and the second TCI state configuration for the second search space set; or a combination thereof. In some examples, the MAC-CE component 1325 may transmit a MAC-CE activating the CORESET with both the first TCI state and the second TCI state.

The default configuration component 1330 may refrain from transmitting an indication of a TCI state configuration for the first search space set. In some examples, the default configuration component 1330 may determine the first TCI state configuration for the first search space set based on the first search space set being associated with the CORESET configured with both the first TCI state and the second TCI state and based on refraining from transmitting the indication of the TCI state configuration for the first search space set. In a first example, the default configuration component 1330 may determine that the first search space set is associated with the first TCI state based on refraining from transmitting the indication of the TCI state configuration for the first search space set and based on the first search space set being associated with the CORESET configured with both the first TCI state and the second TCI state. In a second example, the default configuration component 1330 may determine that the first search space set is associated with both the first TCI state and the second TCI state based on refraining from transmitting the indication of the TCI state configuration for the first search space set and based on the first search space set being associated with the CORESET configured with both the first TCI state and the second TCI state.

In some examples, the PDCCH candidate configuration component 1335 may configure the first PDCCH candidate and the second PDCCH candidate such that the first PDCCH candidate and the second PDCCH candidate are non-overlapping in a time domain based on the second TCI state configuration being different from the first TCI state configuration. In some other examples, the PDCCH candidate configuration component 1335 may configure the first PDCCH candidate and the second PDCCH candidate such that the first PDCCH candidate and the second PDCCH candidate either are non-overlapping in the time domain or are fully overlapping in the time domain based on the second TCI state configuration being different from the first TCI state configuration. In yet some other examples, the PDCCH candidate configuration component 1335 may configure the first PDCCH candidate and the second PDCCH candidate such that the first PDCCH candidate and the second PDCCH candidate are non-overlapping in the time domain, are partially overlapping in the time domain, or are fully overlapping in the time domain.

Figure 14:
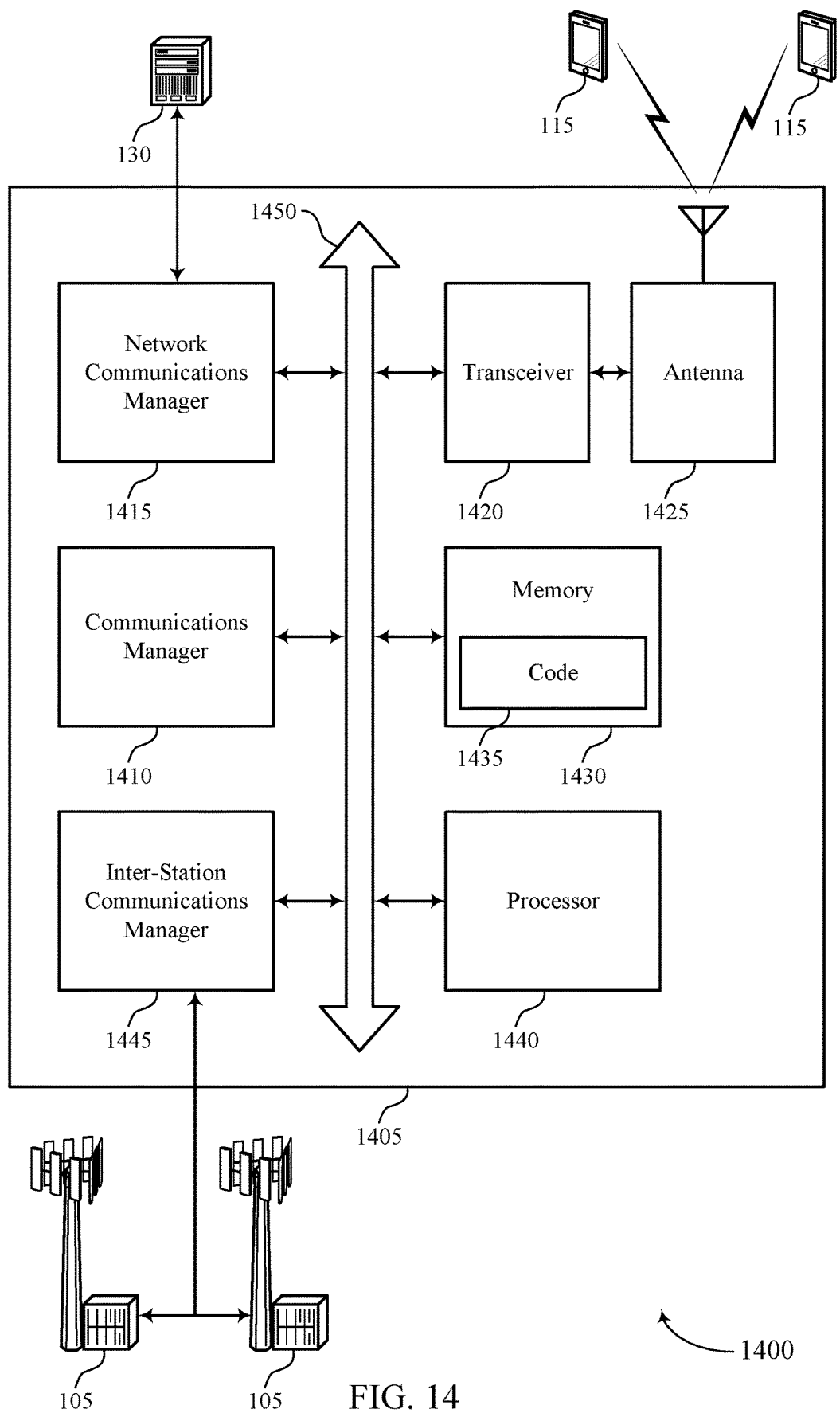
FIG. 14 shows a diagram of a system including a device that supports flexible handling of search space sets for CORESETs configured with multiple TCI states in accordance with aspects of the present disclosure.

FIG. 14 shows a diagram of a system 1400 including a device 1405 that supports flexible handling of search space sets for CORESETs configured with multiple TCI states in accordance with aspects of the present disclosure. The device 1405 may be an example of or include the components of a device 1105, a device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may configure a CORESET with both a first TCI state and a second TCI state. The communications manager 1410 may transmit a first DCI message in a first PDCCH candidate of a first search space set of the CORESET according to a first TCI state configuration which indicates that the first search space set is associated with the first TCI state, the second TCI state, or both. Additionally, the communications manager 1410 may transmit a second DCI message in a second PDCCH candidate of a second search space set of the CORESET according to a second TCI state configuration which indicates that the second search space set is associated with the first TCI state, the second TCI state, or both, where the second TCI state configuration is different from the first TCI state configuration. In some examples, the communications manager 1410 may be configured to perform various operations (e.g., receiving, monitoring, transmitting) using or otherwise in cooperation with the transceiver 1420, the one or more antennas 1425, or any combination thereof. For example, the communications manager 1410 may be configured to receive or transmit messages or other signaling as described herein via the transceiver 1420.

The network communications manager 1415 may manage communications with the core network 130 (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting flexible handling of search space sets for CORESETs configured with multiple TCI states).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
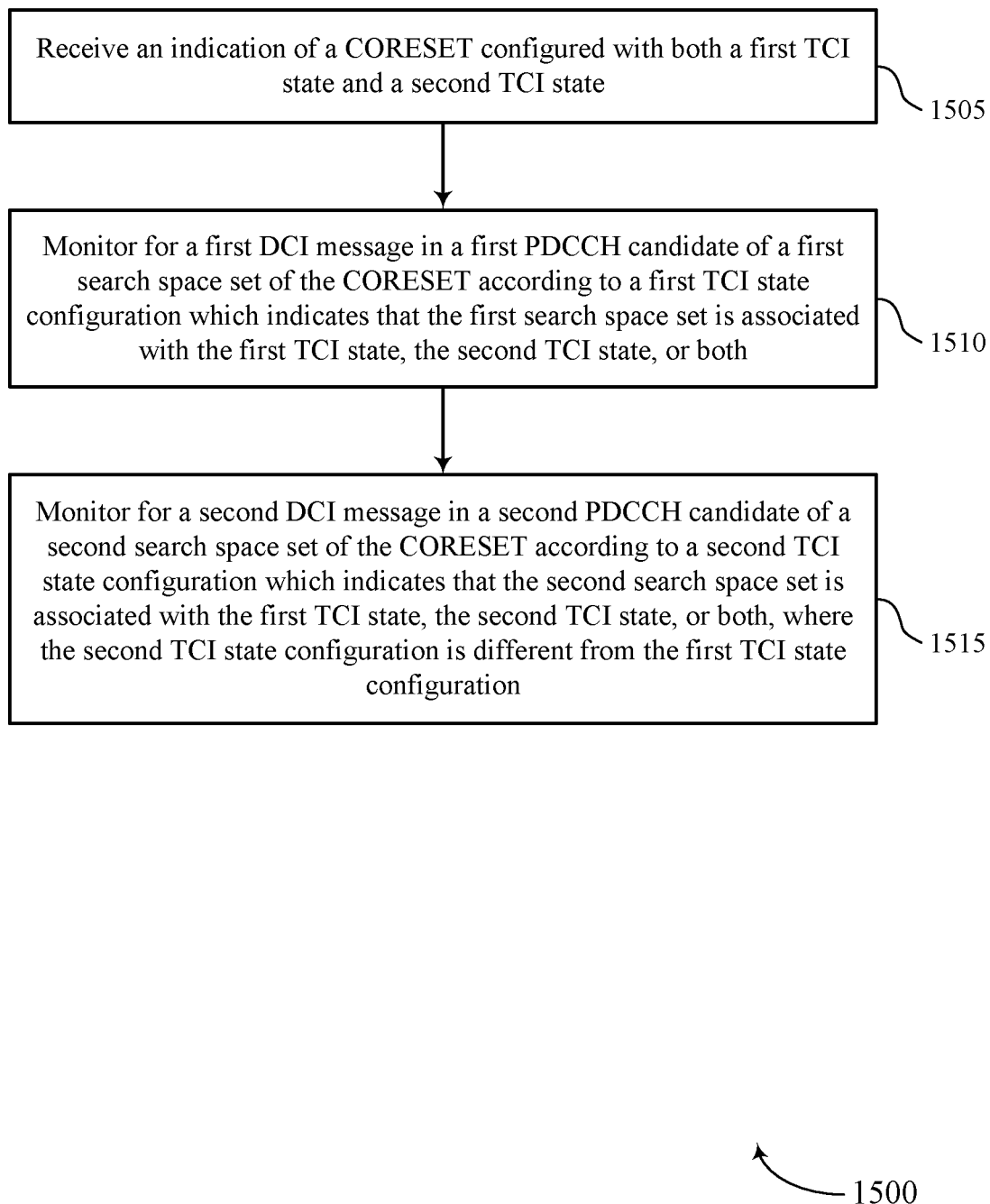
FIGS. 15 through 18 show flowcharts illustrating methods that support flexible handling of search space sets for CORESETs configured with multiple TCI states in accordance with aspects of the present disclosure.

FIG. 15 shows a flowchart illustrating a method 1500 that supports flexible handling of search space sets for CORESETs configured with multiple TCI states in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive an indication of a CORESET configured with both a first TCI state and a second TCI state. The operations of 1505 may be performed according to the methods described herein. In some examples, aspects of the operations of 1505 may be performed by a CORESET configuration component as described with reference to FIG. 7 through 10. Additionally or alternatively, means for performing 1505 may include, for example, an antenna 1025, a transceiver 1020, a communications manager 1010, memory 1030 (e.g., including code 1035), a processor 1040, an I/O controller 1015, a bus 1045, or any combination thereof.

At 1510, the UE may monitor for a first DCI message in a first PDCCH candidate of a first search space set of the CORESET according to a first TCI state configuration which indicates that the first search space set is associated with the first TCI state, the second TCI state, or both. The operations of 1510 may be performed according to the methods described herein. In some examples, aspects of the operations of 1510 may be performed by a monitoring component as described with reference to FIG. 7 through 10. Additionally or alternatively, means for performing 1510 may include, for example, an antenna 1025, a transceiver 1020, a communications manager 1010, memory 1030 (e.g., including code 1035), a processor 1040, an I/O controller 1015, a bus 1045, or any combination thereof.

At 1515, the UE may monitor for a second DCI message in a second PDCCH candidate of a second search space set of the CORESET according to a second TCI state configuration which indicates that the second search space set is associated with the first TCI state, the second TCI state, or both, where the second TCI state configuration is different from the first TCI state configuration. The operations of 1515 may be performed according to the methods described herein. In some examples, aspects of the operations of 1515 may be performed by a monitoring component as described with reference to FIG. 7 through 10. Additionally or alternatively, means for performing 1515 may include, for example, an antenna 1025, a transceiver 1020, a communications manager 1010, memory 1030 (e.g., including code 1035), a processor 1040, an I/O controller 1015, a bus 1045, or any combination thereof.

Figure 16:
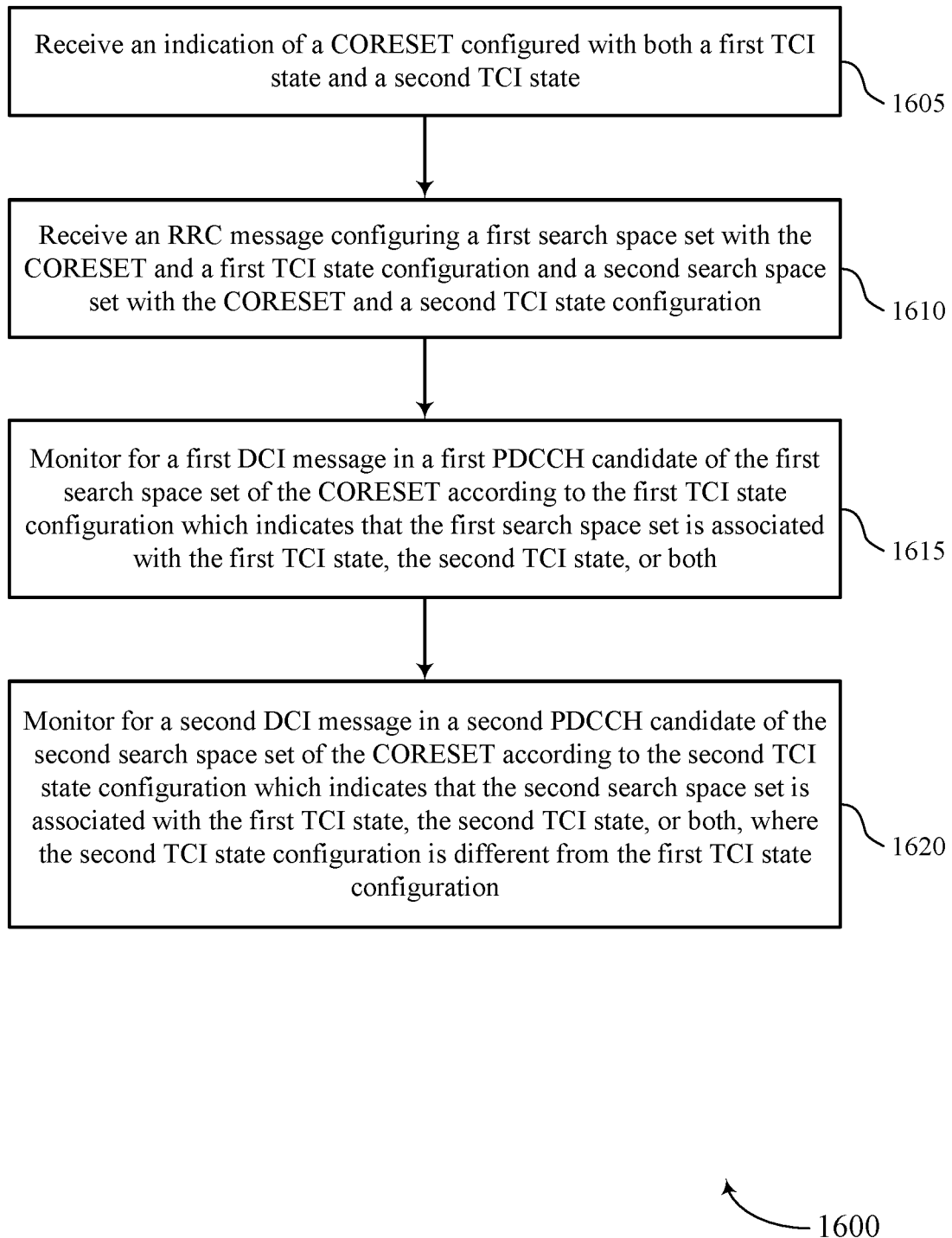

FIG. 16 shows a flowchart illustrating a method 1600 that supports flexible handling of search space sets for CORESETs configured with multiple TCI states in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive an indication of a CORESET configured with both a first TCI state and a second TCI state. The operations of 1605 may be performed according to the methods described herein. In some examples, aspects of the operations of 1605 may be performed by a CORESET configuration component as described with reference to FIG. 7 through 10. Additionally or alternatively, means for performing 1605 may include, for example, an antenna 1025, a transceiver 1020, a communications manager 1010, memory 1030 (e.g., including code 1035), a processor 1040, an I/O controller 1015, a bus 1045, or any combination thereof.

At 1610, the UE may receive an RRC message configuring a first search space set with the CORESET and a first TCI state configuration, a second search space set with the CORESET and a second TCI state configuration, or a combination thereof. In some examples, the RRC message further configures the CORESET (e.g., as described with reference to 1605). The operations of 1610 may be performed according to the methods described herein. In some examples, aspects of the operations of 1610 may be performed by an RRC component as described with reference to FIG. 7 through 10. Additionally or alternatively, means for performing 1610 may include, for example, an antenna 1025, a transceiver 1020, a communications manager 1010, memory 1030 (e.g., including code 1035), a processor 1040, an I/O controller 1015, a bus 1045, or any combination thereof.

At 1615, the UE may monitor for a first DCI message in a first PDCCH candidate of the first search space set of the CORESET according to the first TCI state configuration which indicates that the first search space set is associated with the first TCI state, the second TCI state, or both. The operations of 1615 may be performed according to the methods described herein. In some examples, aspects of the operations of 1615 may be performed by a monitoring component as described with reference to FIG. 7 through 10. Additionally or alternatively, means for performing 1615 may include, for example, an antenna 1025, a transceiver 1020, a communications manager 1010, memory 1030 (e.g., including code 1035), a processor 1040, an I/O controller 1015, a bus 1045, or any combination thereof.

At 1620, the UE may monitor for a second DCI message in a second PDCCH candidate of the second search space set of the CORESET according to the second TCI state configuration which indicates that the second search space set is associated with the first TCI state, the second TCI state, or both, where the second TCI state configuration is different from the first TCI state configuration. The operations of 1620 may be performed according to the methods described herein. In some examples, aspects of the operations of 1620 may be performed by a monitoring component as described with reference to FIG. 7 through 10. Additionally or alternatively, means for performing 1620 may include, for example, an antenna 1025, a transceiver 1020, a communications manager 1010, memory 1030 (e.g., including code 1035), a processor 1040, an I/O controller 1015, a bus 1045, or any combination thereof.

Figure 17:
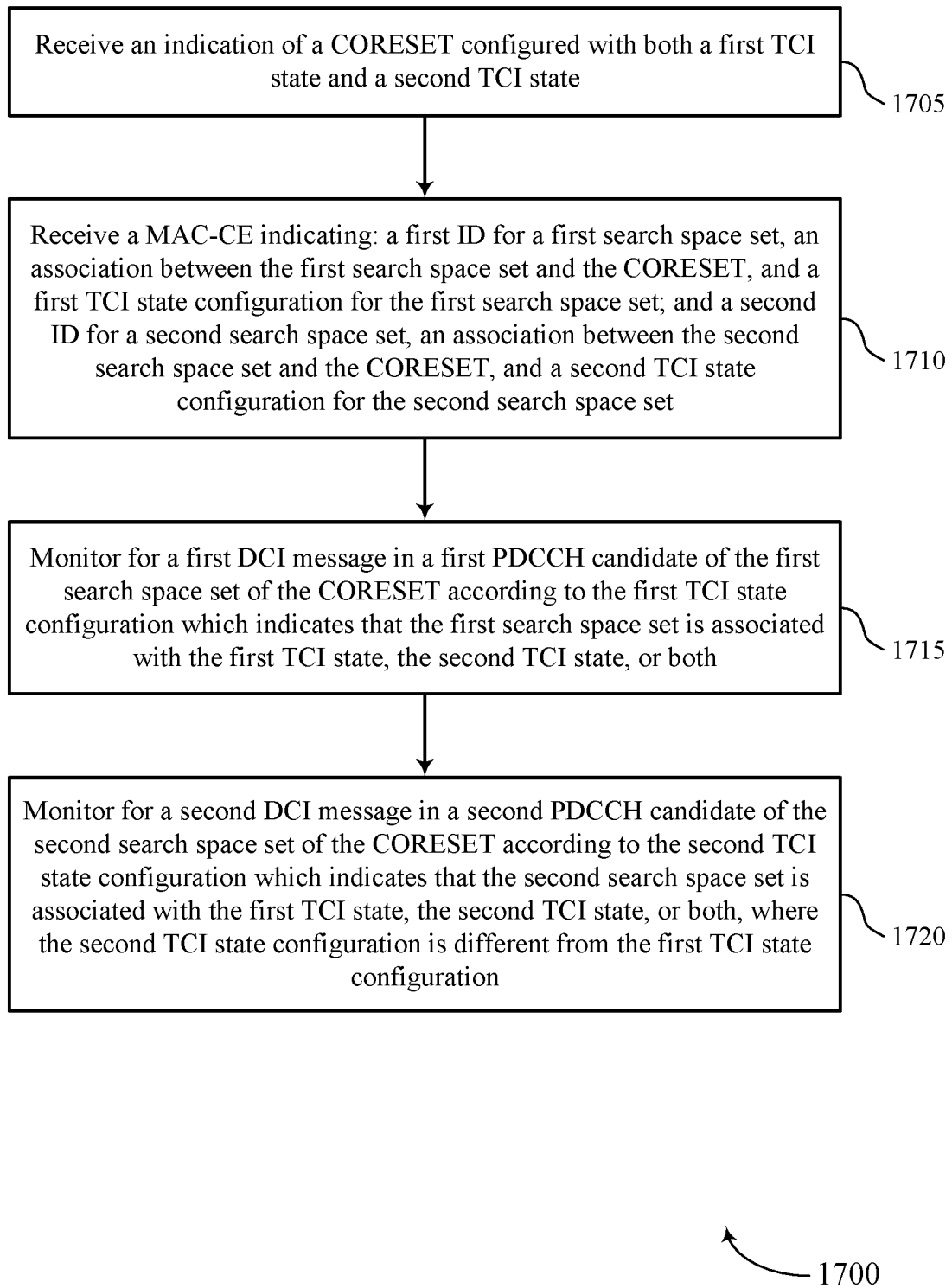

FIG. 17 shows a flowchart illustrating a method 1700 that supports flexible handling of search space sets for CORESETs configured with multiple TCI states in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may receive an indication of a CORESET configured with both a first TCI state and a second TCI state. The operations of 1705 may be performed according to the methods described herein. In some examples, aspects of the operations of 1705 may be performed by a CORESET configuration component as described with reference to FIG. 7 through 10. Additionally or alternatively, means for performing 1705 may include, for example, an antenna 1025, a transceiver 1020, a communications manager 1010, memory 1030 (e.g., including code 1035), a processor 1040, an I/O controller 1015, a bus 1045, or any combination thereof.

At 1710, the UE may receive a MAC-CE indicating a first ID for a first search space set, an association between the first search space set and the CORESET, and a first TCI state configuration for the first search space set; a second ID for a second search space set, an association between the second search space set and the CORESET, and a second TCI state configuration for the second search space set; or a combination thereof. The operations of 1710 may be performed according to the methods described herein. In some examples, aspects of the operations of 1710 may be performed by a MAC-CE component as described with reference to FIG. 7 through 10. Additionally or alternatively, means for performing 1710 may include, for example, an antenna 1025, a transceiver 1020, a communications manager 1010, memory 1030 (e.g., including code 1035), a processor 1040, an I/O controller 1015, a bus 1045, or any combination thereof.

At 1715, the UE may monitor for a first DCI message in a first PDCCH candidate of the first search space set of the CORESET according to the first TCI state configuration which indicates that the first search space set is associated with the first TCI state, the second TCI state, or both. The operations of 1715 may be performed according to the methods described herein. In some examples, aspects of the operations of 1715 may be performed by a monitoring component as described with reference to FIG. 7 through 10. Additionally or alternatively, means for performing 1715 may include, for example, an antenna 1025, a transceiver 1020, a communications manager 1010, memory 1030 (e.g., including code 1035), a processor 1040, an I/O controller 1015, a bus 1045, or any combination thereof.

At 1720, the UE may monitor for a second DCI message in a second PDCCH candidate of the second search space set of the CORESET according to the second TCI state configuration which indicates that the second search space set is associated with the first TCI state, the second TCI state, or both, where the second TCI state configuration is different from the first TCI state configuration. The operations of 1720 may be performed according to the methods described herein. In some examples, aspects of the operations of 1720 may be performed by a monitoring component as described with reference to FIG. 7 through 10. Additionally or alternatively, means for performing 1720 may include, for example, an antenna 1025, a transceiver 1020, a communications manager 1010, memory 1030 (e.g., including code 1035), a processor 1040, an I/O controller 1015, a bus 1045, or any combination thereof.

Figure 18:
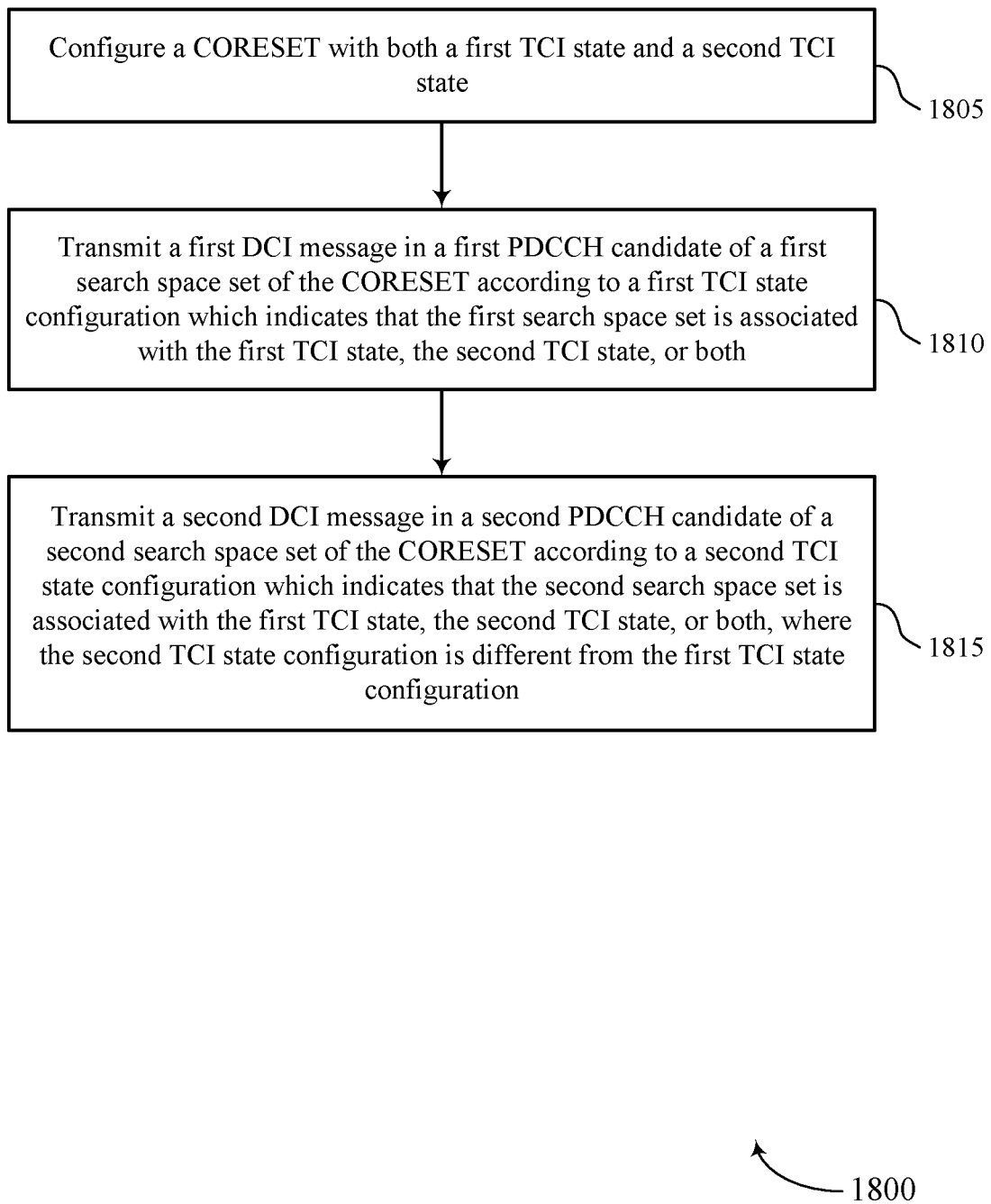

FIG. 18 shows a flowchart illustrating a method 1800 that supports flexible handling of search space sets for CORESETs configured with multiple TCI states in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1805, the base station may configure a CORESET with both a first TCI state and a second TCI state. The operations of 1805 may be performed according to the methods described herein. In some examples, aspects of the operations of 1805 may be performed by a CORESET configuration component as described with reference to FIG. 11 through 14. Additionally or alternatively, means for performing 1805 may include, for example, an antenna 1425, a transceiver 1420, a communications manager 1410, memory 1430 (e.g., including code 1435), a processor 1440, a network communications manager 1415, an inter-station communications manager 1445, a bus 1450, or any combination thereof.

At 1810, the base station may transmit a first DCI message in a first PDCCH candidate of a first search space set of the CORESET according to a first TCI state configuration which indicates that the first search space set is associated with the first TCI state, the second TCI state, or both. The operations of 1810 may be performed according to the methods described herein. In some examples, aspects of the operations of 1810 may be performed by a DCI messaging component as described with reference to FIG. 11 through 14. Additionally or alternatively, means for performing 1810 may include, for example, an antenna 1425, a transceiver 1420, a communications manager 1410, memory 1430 (e.g., including code 1435), a processor 1440, a network communications manager 1415, an inter-station communications manager 1445, a bus 1450, or any combination thereof.

At 1815, the base station may transmit a second DCI message in a second PDCCH candidate of a second search space set of the CORESET according to a second TCI state configuration which indicates that the second search space set is associated with the first TCI state, the second TCI state, or both, where the second TCI state configuration is different from the first TCI state configuration. The operations of 1815 may be performed according to the methods described herein. In some examples, aspects of the operations of 1815 may be performed by a DCI messaging component as described with reference to FIG. 11 through 14. Additionally or alternatively, means for performing 1815 may include, for example, an antenna 1425, a transceiver 1420, a communications manager 1410, memory 1430 (e.g., including code 1435), a processor 1440, a network communications manager 1415, an inter-station communications manager 1445, a bus 1450, or any combination thereof.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: receiving an indication of a CORESET configured with both a first TCI state and a second TCI state; monitoring for a first DCI message in a first PDCCH candidate of a first search space set of the CORESET according to a first TCI state configuration which indicates that the first search space set is associated with the first TCI state, the second TCI state, or both; and monitoring for a second DCI message in a second PDCCH candidate of a second search space set of the CORESET according to a second TCI state configuration which indicates that the second search space set is associated with the first TCI state, the second TCI state, or both, wherein the second TCI state configuration is different from the first TCI state configuration.

Aspect 2: The method of aspect 1, further comprising: receiving an RRC message configuring: the first search space set with the CORESET and the first TCI state configuration; the second search space set with the CORESET and the second TCI state configuration; or a combination thereof.

Aspect 3: The method of any of aspects 1 through 2, further comprising: receiving a MAC-CE indicating: a first ID for the first search space set, an association between the first search space set and the CORESET, and the first TCI state configuration for the first search space set; a second ID for the second search space set, an association between the second search space set and the CORESET, and the second TCI state configuration for the second search space set; or a combination thereof.

Aspect 4: The method of any of aspects 1 through 3, further comprising: determining the first TCI state configuration for the first search space set based at least in part on the first search space set being associated with the CORESET configured with both the first TCI state and the second TCI state.

Aspect 5: The method of aspect 4, further comprising: determining an absence of a TCI state configuration configured by a base station for the first search space set, wherein the first TCI state configuration is determined based at least in part on the determined absence.

Aspect 6: The method of aspect 5, wherein determining the first TCI state configuration comprises: determining that the first search space set is associated with the first TCI state based at least in part on the determined absence and the first search space set being associated with the CORESET configured with both the first TCI state and the second TCI state.

Aspect 7: The method of aspect 5, wherein determining the first TCI state configuration comprises: determining that the first search space set is associated with both the first TCI state and the second TCI state based at least in part on the determined absence and the first search space set being associated with the CORESET configured with both the first TCI state and the second TCI state.

Aspect 8: The method of any of aspects 1 through 7, wherein: the CORESET comprises a plurality of RBs, the plurality of RBs comprising a first set of RBs configured with the first TCI state and a second set of RBs configured with the second TCI state; the first TCI state configuration comprises the first TCI state and not the second TCI state; and the first search space set is associated with the plurality of RBs of the CORESET, wherein monitoring for the first DCI message in the first PDCCH candidate of the first search space set comprises: monitoring for the first DCI message in the first PDCCH candidate of the first search space set according to the first TCI state for the plurality of RBs based at least in part on the first search space set being associated with the plurality of RBs of the CORESET.

Aspect 9: The method of any of aspects 1 through 7, wherein: the CORESET comprises a plurality of RBs, the plurality of RBs comprising a first set of RBs configured with the first TCI state and a second set of RBs configured with the second TCI state; the first TCI state configuration comprises the first TCI state and not the second TCI state; and the first search space set is associated with the first set of RBs configured with the first TCI state based at least in part on the first TCI state configuration comprising the first TCI state and not the second TCI state, wherein monitoring for the first DCI message in the first PDCCH candidate of the first search space set comprises: monitoring for the first DCI message in the first PDCCH candidate of the first search space set according to the first TCI state for the first set of RBs based at least in part on the first search space set being associated with the first set of RBs of the CORESET.

Aspect 10: The method of any of aspects 1 through 7, wherein: the CORESET comprises a plurality of symbols, the plurality of symbols comprising a first set of symbols configured with the first TCI state and a second set of symbols configured with the second TCI state; the first TCI state configuration comprises the first TCI state and not the second TCI state; and the first search space set is associated with the plurality of symbols of the CORESET, wherein monitoring for the first DCI message in the first PDCCH candidate of the first search space set comprises: monitoring for the first DCI message in the first PDCCH candidate of the first search space set according to the first TCI state for the plurality of symbols based at least in part on the first search space set being associated with the plurality of symbols of the CORESET.

Aspect 11: The method of any of aspects 1 through 7, wherein: the CORESET comprises a plurality of symbols, the plurality of symbols comprising a first set of symbols configured with the first TCI state and a second set of symbols configured with the second TCI state; the first TCI state configuration comprises the first TCI state and not the second TCI state; and the first search space set is associated with the first set of symbols configured with the first TCI state based at least in part on the first TCI state configuration comprising the first TCI state and not the second TCI state, wherein monitoring for the first DCI message in the first PDCCH candidate of the first search space set comprises: monitoring for the first DCI message in the first PDCCH candidate of the first search space set according to the first TCI state for the first set of symbols based at least in part on the first search space set being associated with the first set of symbols of the CORESET.

Aspect 12: The method of any of aspects 1 through 11, wherein the first PDCCH candidate and the second PDCCH candidate are non-overlapping in a time domain.

Aspect 13: The method of any of aspects 1 through 11, wherein the first PDCCH candidate and the second PDCCH candidate are non-overlapping in a time domain, partially overlapping in the time domain, or fully overlapping in the time domain.

Aspect 14: The method of any of aspects 1 through 13, wherein: the first PDCCH candidate and the second PDCCH candidate use a same set of CCEs of the CORESET; and the first PDCCH candidate corresponds to a first DCI format and the second PDCCH candidate corresponds to a second DCI format, the first DCI format having a same size as the second DCI format.

Aspect 15: The method of aspect 14, further comprising: counting the first PDCCH candidate and the second PDCCH candidate separately towards a BD limit based at least in part on the second TCI state configuration being different from the first TCI state configuration.

Aspect 16: The method of aspect 14, further comprising: counting the first PDCCH candidate and the second PDCCH candidate jointly towards a BD limit based at least in part on the first PDCCH candidate and the second PDCCH candidate using the same set of CCEs and the first DCI format having the same size as the second DCI format.

Aspect 17: The method of any of aspects 1 through 16, wherein receiving the indication of the CORESET comprises: receiving an RRC message configuring the CORESET with both the first TCI state and the second TCI state.

Aspect 18: The method of any of aspects 1 through 16, wherein receiving the indication of the CORESET comprises: receiving a MAC-CE activating the CORESET with both the first TCI state and the second TCI state.

Aspect 19: A method for wireless communications at a base station, comprising: configuring a CORESET with both a first TCI state and a second TCI state; transmitting a first DCI message in a first PDCCH candidate of a first search space set of the CORESET according to a first TCI state configuration which indicates that the first search space set is associated with the first TCI state, the second TCI state, or both; and transmitting a second DCI message in a second PDCCH candidate of a second search space set of the CORESET according to a second TCI state configuration which indicates that the second search space set is associated with the first TCI state, the second TCI state, or both, wherein the second TCI state configuration is different from the first TCI state configuration.

Aspect 20: The method of aspect 19, further comprising: transmitting an RRC message configuring: the first search space set with the CORESET and the first TCI state configuration; the second search space set with the CORESET and the second TCI state configuration; or a combination thereof.

Aspect 21: The method of any of aspects 19 through 20, further comprising: transmitting a MAC-CE indicating: a first ID for the first search space set, an association between the first search space set and the CORESET, and the first TCI state configuration for the first search space set; a second ID for the second search space set, an association between the second search space set and the CORESET, and the second TCI state configuration for the second search space set; or a combination thereof.

Aspect 22: The method of any of aspects 19 through 21, further comprising: refraining from transmitting an indication of a TCI state configuration for the first search space set; and determining the first TCI state configuration for the first search space set based at least in part on the first search space set being associated with the CORESET configured with both the first TCI state and the second TCI state and based at least in part on refraining from transmitting the indication of the TCI state configuration for the first search space set.

Aspect 23: The method of aspect 22, wherein determining the first TCI state configuration comprises: determining that the first search space set is associated with the first TCI state based at least in part on refraining from transmitting the indication of the TCI state configuration for the first search space set and based at least in part on the first search space set being associated with the CORESET configured with both the first TCI state and the second TCI state.

Aspect 24: The method of aspect 22, wherein determining the first TCI state configuration comprises: determining that the first search space set is associated with both the first TCI state and the second TCI state based at least in part on refraining from transmitting the indication of the TCI state configuration for the first search space set and based at least in part on the first search space set being associated with the CORESET configured with both the first TCI state and the second TCI state.

Aspect 25: The method of any of aspects 19 through 24, further comprising: configuring the first PDCCH candidate and the second PDCCH candidate such that the first PDCCH candidate and the second PDCCH candidate are non-overlapping in a time domain based at least in part on the second TCI state configuration being different from the first TCI state configuration.

Aspect 26: The method of any of aspects 19 through 24, further comprising: configuring the first PDCCH candidate and the second PDCCH candidate such that the first PDCCH candidate and the second PDCCH candidate either are non-overlapping in a time domain or are fully overlapping in the time domain based at least in part on the second TCI state configuration being different from the first TCI state configuration.

Aspect 27: The method of any of aspects 19 through 24, further comprising: configuring the first PDCCH candidate and the second PDCCH candidate such that the first PDCCH candidate and the second PDCCH candidate are non-overlapping in a time domain, are partially overlapping in the time domain, or are fully overlapping in the time domain.

Aspect 28: The method of any of aspects 19 through 27, further comprising: transmitting an RRC message configuring the CORESET with both the first TCI state and the second TCI state.

Aspect 29: The method of any of aspects 19 through 27, further comprising: transmitting a MAC-CE activating the CORESET with both the first TCI state and the second TCI state.

Aspect 30: An apparatus for wireless communications, comprising: a processor of a UE; a transceiver coupled with the processor; and memory coupled with the processor, the memory and the processor configured to cause the apparatus to perform a method of any of aspects 1 through 18.

Aspect 31: An apparatus for wireless communications at a UE, comprising at least one means for performing a method of any of aspects 1 through 18.

Aspect 32: A non-transitory computer-readable medium storing code for wireless communications at a UE, the code comprising instructions executable by a processor to perform a method of any of aspects 1 through 18.

Aspect 33: An apparatus for wireless communications, comprising: a processor of a base station; a transceiver coupled with the processor; and memory coupled with the processor, the memory and the processor configured to cause the apparatus to perform a method of any of aspects 19 through 29.

Aspect 34: An apparatus for wireless communications at a base station, comprising at least one means for performing a method of any of aspects 19 through 29.

Aspect 35: A non-transitory computer-readable medium storing code for wireless communications at a base station, the code comprising instructions executable by a processor to perform a method of any of aspects 19 through 29.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving an indication of a control resource set configured with both a first transmission configuration indicator state and a second transmission configuration indicator state;
   determining a first transmission configuration indicator state configuration for a first search space set associated with the control resource set based at least in part on an absence of a transmission configuration indicator state configuration configured by a network device for the first search space set;
   monitoring for a first downlink control information message in a first physical downlink control channel candidate of the first search space set of the control resource set according to the first transmission configuration indicator state configuration which indicates that the first search space set is associated with the first transmission configuration indicator state, the second transmission configuration indicator state, or both; and
   monitoring for a second downlink control information message in a second physical downlink control channel candidate of a second search space set of the control resource set according to a second transmission configuration indicator state configuration which indicates that the second search space set is associated with the first transmission configuration indicator state, the second transmission configuration indicator state, or both, wherein the second transmission configuration indicator state configuration is different from the first transmission configuration indicator state configuration.

2. The method of claim 1, further comprising:
   receiving a radio resource control message configuring:
      the first search space set with the control resource set;

the second search space set with the control resource set and the second transmission configuration indicator state configuration; or
a combination thereof.

3. The method of claim 1, further comprising:
receiving a medium access control element indicating:
a first identifier for the first search space set and an association between the first search space set and the control resource set;
a second identifier for the second search space set, an association between the second search space set and the control resource set, and the second transmission configuration indicator state configuration for the second search space set; or
a combination thereof.

4. The method of claim 1, wherein determining the first transmission configuration indicator state configuration comprises:
determining that the first search space set is associated with the first transmission configuration indicator state based at least in part on the absence of the transmission configuration indicator state configuration configured by the network device and the first search space set being associated with the control resource set configured with both the first transmission configuration indicator state and the second transmission configuration indicator state.

5. The method of claim 1, wherein determining the first transmission configuration indicator state configuration comprises:
determining that the first search space set is associated with both the first transmission configuration indicator state and the second transmission configuration indicator state based at least in part on the absence of the transmission configuration indicator state configuration configured by the network device and the first search space set being associated with the control resource set configured with both the first transmission configuration indicator state and the second transmission configuration indicator state.

6. The method of claim 1, wherein:
the control resource set comprises a plurality of resource blocks, the plurality of resource blocks comprising a first set of resource blocks configured with the first transmission configuration indicator state and a second set of resource blocks configured with the second transmission configuration indicator state;
the first transmission configuration indicator state configuration comprises the first transmission configuration indicator state and not the second transmission configuration indicator state; and
the first search space set is associated with the plurality of resource blocks of the control resource set, wherein monitoring for the first downlink control information message in the first physical downlink control channel candidate of the first search space set comprises:
monitoring for the first downlink control information message in the first physical downlink control channel candidate of the first search space set according to the first transmission configuration indicator state for the plurality of resource blocks based at least in part on the first search space set being associated with the plurality of resource blocks of the control resource set.

7. The method of claim 1, wherein:
the control resource set comprises a plurality of resource blocks, the plurality of resource blocks comprising a first set of resource blocks configured with the first transmission configuration indicator state and a second set of resource blocks configured with the second transmission configuration indicator state;
the first transmission configuration indicator state configuration comprises the first transmission configuration indicator state and not the second transmission configuration indicator state; and
the first search space set is associated with the first set of resource blocks configured with the first transmission configuration indicator state based at least in part on the first transmission configuration indicator state configuration comprising the first transmission configuration indicator state and not the second transmission configuration indicator state, wherein monitoring for the first downlink control information message in the first physical downlink control channel candidate of the first search space set comprises:
monitoring for the first downlink control information message in the first physical downlink control channel candidate of the first search space set according to the first transmission configuration indicator state for the first set of resource blocks based at least in part on the first search space set being associated with the first set of resource blocks of the control resource set.

8. The method of claim 1, wherein:
the control resource set comprises a plurality of symbols, the plurality of symbols comprising a first set of symbols configured with the first transmission configuration indicator state and a second set of symbols configured with the second transmission configuration indicator state;
the first transmission configuration indicator state configuration comprises the first transmission configuration indicator state and not the second transmission configuration indicator state; and
the first search space set is associated with the plurality of symbols of the control resource set, wherein monitoring for the first downlink control information message in the first physical downlink control channel candidate of the first search space set comprises:
monitoring for the first downlink control information message in the first physical downlink control channel candidate of the first search space set according to the first transmission configuration indicator state for the plurality of symbols based at least in part on the first search space set being associated with the plurality of symbols of the control resource set.

9. The method of claim 1, wherein:
the control resource set comprises a plurality of symbols, the plurality of symbols comprising a first set of symbols configured with the first transmission configuration indicator state and a second set of symbols configured with the second transmission configuration indicator state;
the first transmission configuration indicator state configuration comprises the first transmission configuration indicator state and not the second transmission configuration indicator state; and
the first search space set is associated with the first set of symbols configured with the first transmission configuration indicator state based at least in part on the first transmission configuration indicator state configuration comprising the first transmission configuration indicator state and not the second transmission configuration indicator state, wherein monitoring for the first downlink control information message in the first physical downlink control channel candidate of the first search space set comprises:
monitoring for the first downlink control information message in the first physical downlink control channel candidate of the first search space set according to the first transmission configuration indicator state for the first set of symbols based at least in part on the first search space set being associated with the first set of symbols of the control resource set.

10. The method of claim 1, wherein the first physical downlink control channel candidate and the second physical downlink control channel candidate are non-overlapping in a time domain.

11. The method of claim 1, wherein the first physical downlink control channel candidate and the second physical downlink control channel candidate are non-overlapping in a time domain, partially overlapping in the time domain, or fully overlapping in the time domain.

12. The method of claim 1, wherein:
the first physical downlink control channel candidate and the second physical downlink control channel candidate use a same set of control channel elements of the control resource set; and
the first physical downlink control channel candidate corresponds to a first downlink control information format and the second physical downlink control channel candidate corresponds to a second downlink control information format, the first downlink control information format having a same size as the second downlink control information format.

13. The method of claim 12, further comprising:
counting the first physical downlink control channel candidate and the second physical downlink control channel candidate separately towards a blind decoding limit based at least in part on the second transmission configuration indicator state configuration being different from the first transmission configuration indicator state configuration.

14. The method of claim 12, further comprising:
counting the first physical downlink control channel candidate and the second physical downlink control channel candidate jointly towards a blind decoding limit based at least in part on the first physical downlink control channel candidate and the second physical downlink control channel candidate using the same set of control channel elements and the first downlink control information format having the same size as the second downlink control information format.

15. The method of claim 1, wherein receiving the indication of the control resource set comprises:
receiving a radio resource control message configuring the control resource set with both the first transmission configuration indicator state and the second transmission configuration indicator state.

16. The method of claim 1, wherein receiving the indication of the control resource set comprises:
receiving a medium access control element activating the control resource set with both the first transmission configuration indicator state and the second transmission configuration indicator state.

17. An apparatus for wireless communications, comprising:
a processor of a user equipment (UE);
a transceiver coupled with the processor; and
memory coupled with the processor, the memory and the processor configured to cause the apparatus to:
receive, via the transceiver, an indication of a control resource set configured with both a first transmission configuration indicator state and a second transmission configuration indicator state;
determine a first transmission configuration indicator state configuration for a first search space set associated with the control resource set based at least in part on an absence of a transmission configuration indicator state configuration configured by a network device for the first search space set;
monitor, via the transceiver, for a first downlink control information message in a first physical downlink control channel candidate of the first search space set of the control resource set according to the first transmission configuration indicator state configuration which indicates that the first search space set is associated with the first transmission configuration indicator state, the second transmission configuration indicator state, or both; and
monitor, via the transceiver, for a second downlink control information message in a second physical downlink control channel candidate of a second search space set of the control resource set according to a second transmission configuration indicator state configuration which indicates that the second search space set is associated with the first transmission configuration indicator state, the second transmission configuration indicator state, or both, wherein the second transmission configuration indicator state configuration is different from the first transmission configuration indicator state configuration.

18. The apparatus of claim 17, the memory and the processor further configured to cause the apparatus to:
receive, via the transceiver, a radio resource control message configuring:
the first search space set with the control resource set;
the second search space set with the control resource set and the second transmission configuration indicator state configuration; or
a combination thereof.

19. The apparatus of claim 17, the memory and the processor further configured to cause the apparatus to:
receive, via the transceiver, a medium access control element indicating:
a first identifier for the first search space set and an association between the first search space set and the control resource set;
a second identifier for the second search space set, an association between the second search space set and the control resource set, and the second transmission configuration indicator state configuration for the second search space set; or
a combination thereof.

20. The apparatus of claim 17, the memory and the processor configured to cause the apparatus to determine the first transmission configuration indicator state configuration configured to cause the apparatus to:
determine that the first search space set is associated with the first transmission configuration indicator state based at least in part on the absence of the transmission configuration indicator state configuration configured by the network device and the first search space set being associated with the control resource set configured with both the first transmission configuration indicator state and the second transmission configuration indicator state.

21. The apparatus of claim 17, the memory and the processor configured to cause the apparatus to determine the first transmission configuration indicator state configuration configured to cause the apparatus to:
  determine that the first search space set is associated with both the first transmission configuration indicator state and the second transmission configuration indicator state based at least in part on the absence of the transmission configuration indicator state configuration configured by the network device and the first search space set being associated with the control resource set configured with both the first transmission configuration indicator state and the second transmission configuration indicator state.

22. The apparatus of claim 17, wherein:
  the control resource set comprises a plurality of resource blocks, the plurality of resource blocks comprising a first set of resource blocks configured with the first transmission configuration indicator state and a second set of resource blocks configured with the second transmission configuration indicator state;
  the first transmission configuration indicator state configuration comprises the first transmission configuration indicator state and not the second transmission configuration indicator state; and
  the first search space set is associated with the plurality of resource blocks of the control resource set, the memory and the processor configured to cause the apparatus to monitor for the first downlink control information message in the first physical downlink control channel candidate of the first search space set configured to cause the apparatus to:
    monitor, via the transceiver, for the first downlink control information message in the first physical downlink control channel candidate of the first search space set according to the first transmission configuration indicator state for the plurality of resource blocks based at least in part on the first search space set being associated with the plurality of resource blocks of the control resource set.

23. The apparatus of claim 17, wherein:
  the control resource set comprises a plurality of resource blocks, the plurality of resource blocks comprising a first set of resource blocks configured with the first transmission configuration indicator state and a second set of resource blocks configured with the second transmission configuration indicator state;
  the first transmission configuration indicator state configuration comprises the first transmission configuration indicator state and not the second transmission configuration indicator state; and
  the first search space set is associated with the first set of resource blocks configured with the first transmission configuration indicator state based at least in part on the first transmission configuration indicator state configuration comprising the first transmission configuration indicator state and not the second transmission configuration indicator state, the memory and the processor configured to cause the apparatus to monitor for the first downlink control information message in the first physical downlink control channel candidate of the first search space set configured to cause the apparatus to:
    monitor, via the transceiver, for the first downlink control information message in the first physical downlink control channel candidate of the first search space set according to the first transmission configuration indicator state for the first set of resource blocks based at least in part on the first search space set being associated with the first set of resource blocks of the control resource set.

24. The apparatus of claim 17, wherein:
  the control resource set comprises a plurality of symbols, the plurality of symbols comprising a first set of symbols configured with the first transmission configuration indicator state and a second set of symbols configured with the second transmission configuration indicator state;
  the first transmission configuration indicator state configuration comprises the first transmission configuration indicator state and not the second transmission configuration indicator state; and
  the first search space set is associated with the plurality of symbols of the control resource set, the memory and the processor configured to cause the apparatus to monitor for the first downlink control information message in the first physical downlink control channel candidate of the first search space set configured to cause the apparatus to:
    monitor, via the transceiver, for the first downlink control information message in the first physical downlink control channel candidate of the first search space set according to the first transmission configuration indicator state for the plurality of symbols based at least in part on the first search space set being associated with the plurality of symbols of the control resource set.

25. The apparatus of claim 17, wherein:
  the control resource set comprises a plurality of symbols, the plurality of symbols comprising a first set of symbols configured with the first transmission configuration indicator state and a second set of symbols configured with the second transmission configuration indicator state;
  the first transmission configuration indicator state configuration comprises the first transmission configuration indicator state and not the second transmission configuration indicator state; and
  the first search space set is associated with the first set of symbols configured with the first transmission configuration indicator state based at least in part on the first transmission configuration indicator state configuration comprising the first transmission configuration indicator state and not the second transmission configuration indicator state, the memory and the processor configured to cause the apparatus to monitor for the first downlink control information message in the first physical downlink control channel candidate of the first search space set configured to cause the apparatus to:
    monitor, via the transceiver, for the first downlink control information message in the first physical downlink control channel candidate of the first search space set according to the first transmission configuration indicator state for the first set of symbols based at least in part on the first search space set being associated with the first set of symbols of the control resource set.

26. An apparatus for wireless communications at a user equipment (UE), comprising:
  means for receiving an indication of a control resource set configured with both a first transmission configuration indicator state and a second transmission configuration indicator state;
  means for determining a first transmission configuration indicator state configuration for a first search space set associated with the control resource set based at least in part on an absence of a transmission configuration indicator state configuration configured by a network device for the first search space set;

means for monitoring for a first downlink control information message in a first physical downlink control channel candidate of the first search space set of the control resource set according to the first transmission configuration indicator state configuration which indicates that the first search space set is associated with the first transmission configuration indicator state, the second transmission configuration indicator state, or both; and means for monitoring for a second downlink control information message in a second physical downlink control channel candidate of a second search space set of the control resource set according to a second transmission configuration indicator state configuration which indicates that the second search space set is associated with the first transmission configuration indicator state, the second transmission configuration indicator state, or both, wherein the second transmission configuration indicator state configuration is different from the first transmission configuration indicator state configuration.

27. A non-transitory computer-readable medium storing code for wireless communications at a user equipment (UE), the code comprising instructions executable by a processor to:

receive an indication of a control resource set configured with both a first transmission configuration indicator state and a second transmission configuration indicator state;

determine a first transmission configuration indicator state configuration for a first search space set associated with the control resource set based at least in part on an absence of a transmission configuration indicator state configuration configured by a network device for the first search space set;

monitor for a first downlink control information message in a first physical downlink control channel candidate of the first search space set of the control resource set according to the first transmission configuration indicator state configuration which indicates that the first search space set is associated with the first transmission configuration indicator state, the second transmission configuration indicator state, or both; and monitor for a second downlink control information message in a second physical downlink control channel candidate of a second search space set of the control resource set according to a second transmission configuration indicator state configuration which indicates that the second search space set is associated with the first transmission configuration indicator state, the second transmission configuration indicator state, or both, wherein the second transmission configuration indicator state configuration is different from the first transmission configuration indicator state configuration.

* * * * *